US012236760B2

United States Patent
Karibandi et al.

(10) Patent No.: US 12,236,760 B2
(45) Date of Patent: *Feb. 25, 2025

(54) REMOTE ORDER AUTHENTICATION ON A KIOSK

(71) Applicant: THE COCA-COLA COMPANY, Atlanta, GA (US)

(72) Inventors: Akhil Karibandi, Marietta, GA (US); Doug McDougall, Atlanta, GA (US); Zachary Shear, Minnetrista, MN (US); Elijah Wise, Atlanta, GA (US); Catherine Elizabeth Anne Nephew, Atlanta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,215

(22) Filed: Jan. 29, 2024

(65) Prior Publication Data
US 2024/0249581 A1 Jul. 25, 2024

Related U.S. Application Data

(63) Continuation of application No. 17/254,158, filed as application No. PCT/US2019/038271 on Jun. 20, 2019, now Pat. No. 11,915,561.

(Continued)

(51) Int. Cl.
G07F 9/00 (2006.01)
G06Q 20/18 (2012.01)
(Continued)

(52) U.S. Cl.
CPC ............ *G07F 9/001* (2020.05); *G06Q 20/18* (2013.01); *G06Q 20/3267* (2020.05);
(Continued)

(58) Field of Classification Search
CPC ...... G07F 9/001; G07F 7/1025; G07F 13/065; G06Q 20/3267; G06Q 20/18; G06Q 20/4012
See application file for complete search history.

(56) References Cited

U.S. PATENT DOCUMENTS 6,759,072 B1 * 7/2004 Gutwein .............. G06Q 20/342
426/429
7,455,867 B1 * 11/2008 Gutwein ............... A47J 31/002
426/433
(Continued)

FOREIGN PATENT DOCUMENTS

CN 1744124 3/2006
CN 102187714 9/2011
(Continued)

OTHER PUBLICATIONS

International Search Report and Written Opinion for International Application No. PCT/US2019/038271 dated Oct. 7, 2019.
(Continued)

*Primary Examiner* — Michael Collins
(74) *Attorney, Agent, or Firm* — Meunier Carlin & Curfman LLC

(57) ABSTRACT

A kiosk maintains a list of pre-paid orders. A first authentication process enables a consumer to select their order on the kiosk so as to receive the product or service that was remotely paid for via a mobile application. Authentication of the consumer selecting the order is performed based upon sending an order authentication notification to the mobile application that completed the order. If the user of the mobile application provides a positive authentication reply, the kiosk is unlocked to fulfill the order. The consumer may alternatively be authenticated by providing a personal identification number (PIN) that is associated with the order or associated with a user of the mobile application. Authenti- (Continued)

cation using the PIN enables a consumer to interact with the kiosk to receive the previously ordered product or service without having to access their mobile phone or mobile application that was used to place the order.

12 Claims, 13 Drawing Sheets

Related U.S. Application Data

(60) Provisional application No. 62/687,344, filed on Jun. 20, 2018.

(51) Int. Cl.
    *G06Q 20/32* (2012.01)
    *G06Q 20/40* (2012.01)
    *G07F 7/10* (2006.01)
    *G07F 13/06* (2006.01)

(52) U.S. Cl.
    CPC ....... *G06Q 20/4012* (2013.01); *G07F 7/1025* (2013.01); *G07F 13/065* (2013.01)

(56) References Cited

U.S. PATENT DOCUMENTS

| | | | |
|---|---|---|---|
| 7,578,415 | B2 | 8/2009 | Ziesel et al. |
| 7,866,509 | B2 | 1/2011 | Ziesel |
| 8,003,145 | B2* | 8/2011 | Gutwein .................. G07F 7/005 |
| | | | 426/429 |
| 8,126,589 | B1 | 2/2012 | Parker |
| 8,442,674 | B2 | 5/2013 | Tilton et al. |
| 8,893,922 | B2 | 11/2014 | Azzano |
| 9,026,245 | B2 | 5/2015 | Tilton et al. |
| 9,276,910 | B2 | 3/2016 | Tang |
| 9,799,034 | B1 | 10/2017 | Varma et al. |
| 10,318,120 | B2 | 6/2019 | Kwak et al. |
| 10,472,220 | B2 | 11/2019 | Moore et al. |
| 11,017,624 | B2* | 5/2021 | Jain .......................... G07F 11/70 |
| 11,087,376 | B2 | 8/2021 | Cuppari |
| 11,657,669 | B2* | 5/2023 | Jain ..................... G07F 11/1657 |
| | | | 700/233 |
| 11,915,561 | B2* | 2/2024 | Karibandi ............. G06Q 20/322 |
| 11,961,354 | B2* | 4/2024 | Jain ..................... G07F 11/1657 |
| 2012/0253993 | A1 | 10/2012 | Yoakim et al. |
| 2013/0096715 | A1 | 4/2013 | Chung et al. |
| 2013/0290146 | A1 | 10/2013 | West |
| 2014/0272049 | A1 | 9/2014 | Azzano et al. |
| 2015/0006330 | A1 | 1/2015 | Polack |
| 2015/0082243 | A1 | 3/2015 | Taylor et al. |
| 2016/0232515 | A1 | 8/2016 | Jhas et al. |
| 2016/0244311 | A1 | 8/2016 | Burks et al. |
| 2016/0325980 | A1 | 11/2016 | Sawhney et al. |
| 2017/0186110 | A1 | 6/2017 | Carpenter et al. |
| 2017/0221296 | A1* | 8/2017 | Jain ..................... G07F 17/0064 |
| 2019/0164237 | A1 | 5/2019 | Newman et al. |
| 2019/0259077 | A1 | 8/2019 | Cuppari et al. |

FOREIGN PATENT DOCUMENTS

| | | |
|---|---|---|
| CN | 105825583 | 8/2016 |
| CN | 107316193 | 11/2017 |
| KR | 10-2014-0125090 | 10/2014 |
| KR | 10-2015-0007912 A | 1/2015 |
| WO | 2015167846 | 11/2015 |
| WO | 2018071685 | 4/2018 |

OTHER PUBLICATIONS

International Preliminary Report on Patentability issued for International Application No. PCT/US2019/038271, dated Dec. 30, 2020.
Extended European Search Report issued in EP19822309.1, mailed Feb. 14, 2022.
Office Action issued in EP19822309.1, mailed Mar. 28, 2024.
Jay Moye, "Coke Testing Self-Serve Water Station with Flavors and Bubbles", Aug. 22, 2017, 5 pages.
English translation of Chinese Office Action issued in CN 2019800526639, mailed Oct. 26, 2023.
English translation of Chinese Office Action issued in CN 2019800526639, mailed Apr. 17, 2024.
Decision of Rejection for Chinese Application No. 201980052663.9 dated Sep. 3, 2024.
English Translation of Korean Office Action issued in KR10-2021-7001624, mailed Dec. 30, 2024.

* cited by examiner

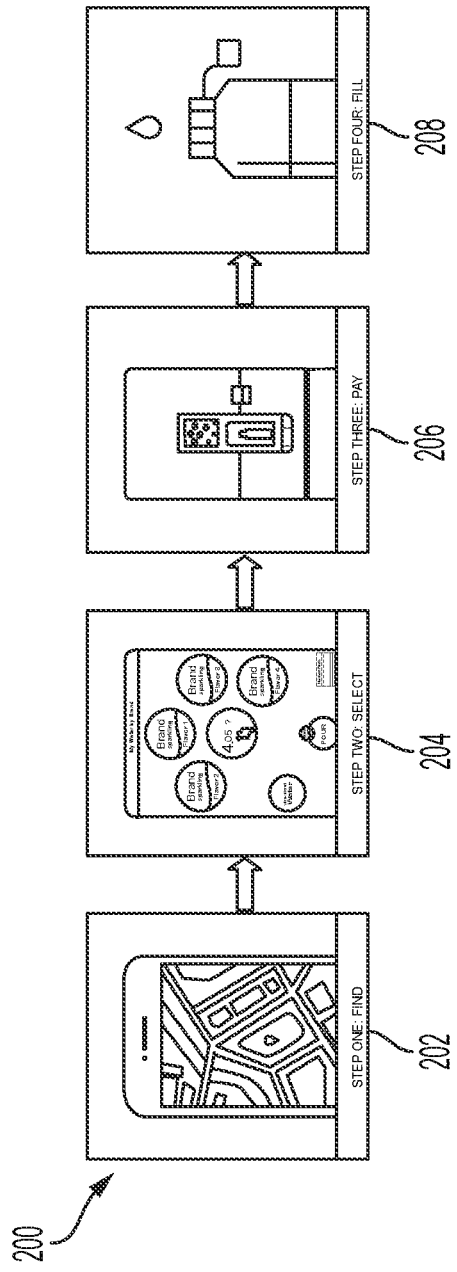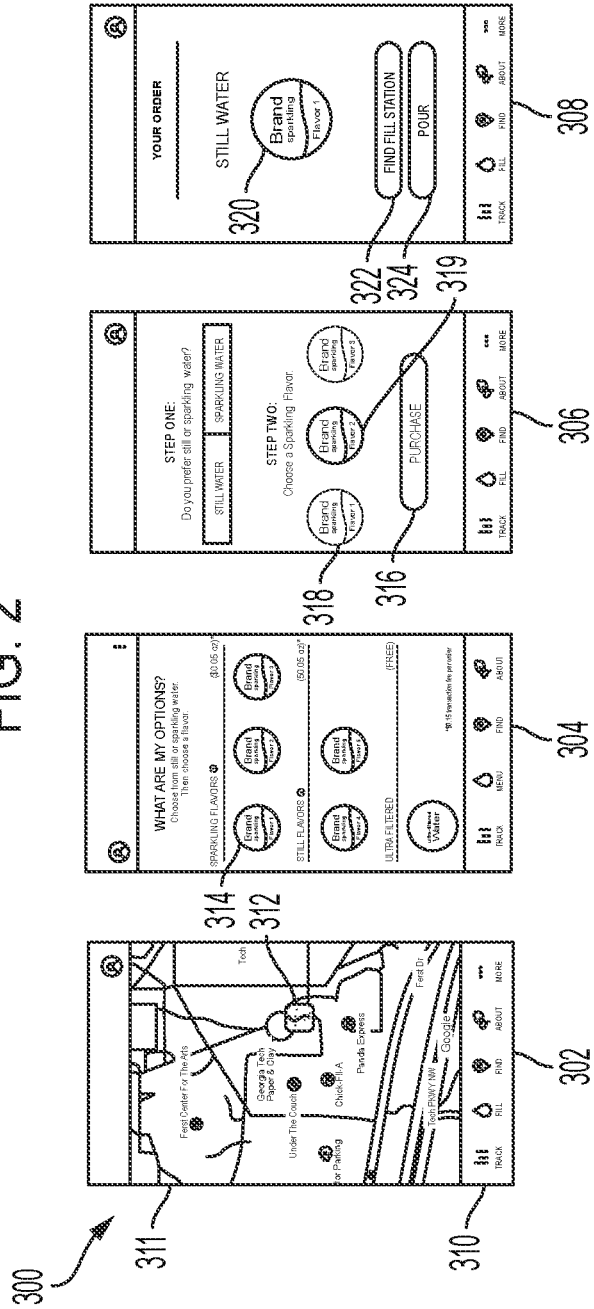

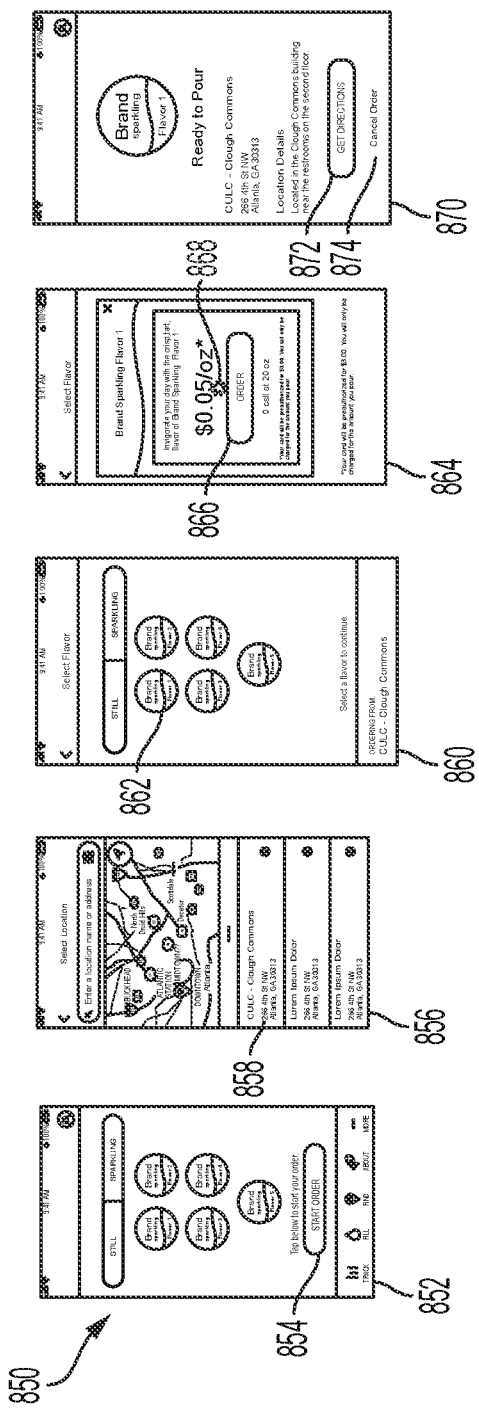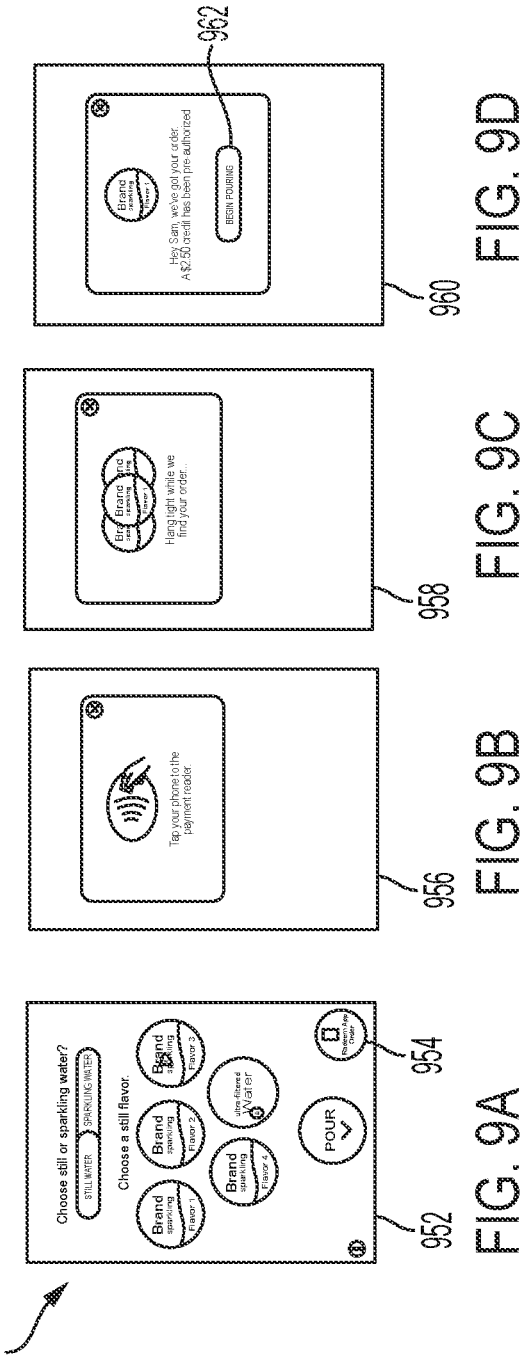

REMOTE ORDER AUTHENTICATION ON A KIOSK

CROSS REFERENCE TO RELATED APPLICATIONS

This application claims priority to U.S. application Ser. No. 17/254,158 filed Dec. 18, 2020, which is a national stage application filed under 35 U.S.C. § 371 of PCT/US2019/038271 on Jun. 20, 2019, which claims the benefit of U.S. Provisional Patent Application Ser. No. 62/687,344 filed Jun. 20, 2018, the disclosures of which are expressly incorporated herein by reference.

BACKGROUND

Traditional post-mix beverage dispensing systems generally mix streams of syrup, concentrate, sweetener, bonus flavors, other types of flavorings, and/or other ingredients with water or other types of diluents by flowing the syrup stream down the center of the nozzle with the water stream flowing around the outside. The syrup stream is directed downward with the water stream such that the streams mix as they fall into a consumer's cup. There is a desire for a beverage dispensing system as a whole to provide as many different types and flavors of beverages as may be possible in a footprint that may be as small as possible. Recent improvements in beverage dispensing technology have focused on the use of micro-ingredients. With micro-ingredients, the traditional beverage bases may be separated into their constituent parts at much higher dilution or reconstitution ratios.

This technology is enabled via cartridges containing the highly concentrated micro-ingredients. The micro-ingredients are mixed with sweeteners and still or sparkling water using precise metering and dosing technologies and dispensed through a nozzle that promotes in-air mixing so as to prevent carry-over. The technology includes a user input for a user to select a desired beverage, customize the beverage if desired, and pour the beverage at the dispenser. These beverages are made from precise recipes to ensure a great tasting beverage regardless of the customization.

SUMMARY

According to an aspect of the disclosure, a beverage vendor comprises a nozzle configured to dispense one or more beverage ingredients of a beverage associated with an order. The beverage vendor also comprises a user interface configured to display a list of pending orders. The beverage vendor also comprises a plurality of pumping or metering devices, each configured to supply a beverage ingredient from an ingredient source to the nozzle. The beverage vendor also comprises a controller configured to receive a selection of an order from the list of pending orders and authenticate the order for being dispensed from the nozzle, wherein upon authenticating the order, the controller is configured to initiate a pour operation of the order from the nozzle.

In some implementations, authenticating the order comprises receiving a personal identification number (PIN) code on the user interface. The controller is further configured to authenticate the PIN code based on comparison with an authentic PIN maintained with the order in the list of pending orders. Alternatively, the controller is further configured to request authentication of the PIN from a server in communication with the beverage vendor and receive an authentication reply from the server.

In some implementations, the controller is further configured to send an order notification of the selected order to a server in communication with the beverage vendor. The controller is further configured to receive an authentication reply from the server in response to the server receiving an authentication reply from a mobile device that placed the order.

In any of the above implementations, the list of pending orders include orders that have been purchased, but not fulfilled. The controller is configured to update the list of pending orders to add an order associated with a mobile device that is proximate to the beverage vendor.

In some implementations, the beverage vendor further comprises a beacon configured to broadcast a beacon message with a unique identifier of the beverage vendor. The mobile device is determined to be proximate to the beverage vendor upon receiving the beacon message.

In some implementations, the controller is configured to update the list of pending orders to remove an order that has been fulfilled at the beverage vendor.

In some implementations, the controller is configured to update the list of pending orders to remove an order that is associated with a mobile device that is determined to not be proximate to the beverage vendor.

In some implementations, the controller is configured to update the list of pending orders to add an order that designates the beverage vendor for fulfillment of the order.

According to another aspect of the disclosure a system comprises a kiosk configured to provide a product or service available for purchase, wherein the kiosk is further configured to maintain a list of pending orders, wherein each order on the list of pending orders is received after the order has been purchased through a mobile application on a mobile device. The system also comprises a server in communication with the kiosk and configured to provide an authentication message to the kiosk upon authenticating a selected order from the list to be fulfilled at the kiosk.

In some implementations, the kiosk comprises a user interface configured to display the list of pending orders and is further configured to receive a selection of the selected order from the user interface. The kiosk is further configured to receive a PIN code on the user interface to authenticate the selected order. The kiosk is further configured to authenticate the PIN code based on comparison with an authentic PIN maintained with the selected order in the list of pending orders. Alternatively, the kiosk is further configured to request authentication of the PIN from the server and receive an authentication reply from the server.

In some implementations, the kiosk is further configured to send an order notification of the selected order to the server. The server is further configured to send an authentication request to a mobile device associated with the selected order and receive an authentication reply from the mobile device associated with the selected order.

In some implementations, the kiosk is configured to update the list of pending orders to add an order associated with a mobile device that is proximate to the kiosk. The server is configured to receive a proximity notification from the mobile device that is proximate to the kiosk. The kiosk comprises a beacon configured to broadcast a beacon message with a unique identifier of the kiosk. The proximity notification comprises the unique identifier of the kiosk.

In some implementations, the kiosk is configured to update the list of pending orders to remove an order that has been fulfilled at the kiosk.

In some implementations, the kiosk is configured to update the list of pending orders to remove an order that is associated with a mobile device that is determined to not be proximate to the beverage vendor.

In some implementations, the kiosk is configured to update the list of pending orders to add an order that designates the kiosk for fulfillment of the order.

According to another aspect of the disclosure a system comprises a kiosk configured to provide a product or service available for purchase. The system further comprises a payment module in communication with the kiosk configured to wirelessly communicate with a secured mobile wallet application on a mobile device to receive a credit amount and an indication of the product or service purchased through a mobile application on the mobile device. The credit amount and the indication of the product or service are received from a beverage vendor card in the secured mobile wallet application. The kiosk comprises a user interface configured to display a dispense screen with a dispense icon. In response to selection of the dispense icon, the kiosk is configured to provide the product or service purchased through the mobile application up to the credit amount.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2 illustrates an exemplary remote ordering process according to various embodiments of the disclosure.

FIGS. 3A-3D illustrate exemplary mobile application user interfaces for the remote ordering process according to various embodiments of the disclosure.

FIGS. 8A-8E illustrate exemplary mobile application user interfaces for the remote ordering process according to various embodiments of the disclosure.

FIGS. 9A-9D illustrate exemplary kiosk user interfaces for the remote order authentication on the kiosk according to various embodiments of the disclosure.

DETAILED DESCRIPTION

Figure 1:
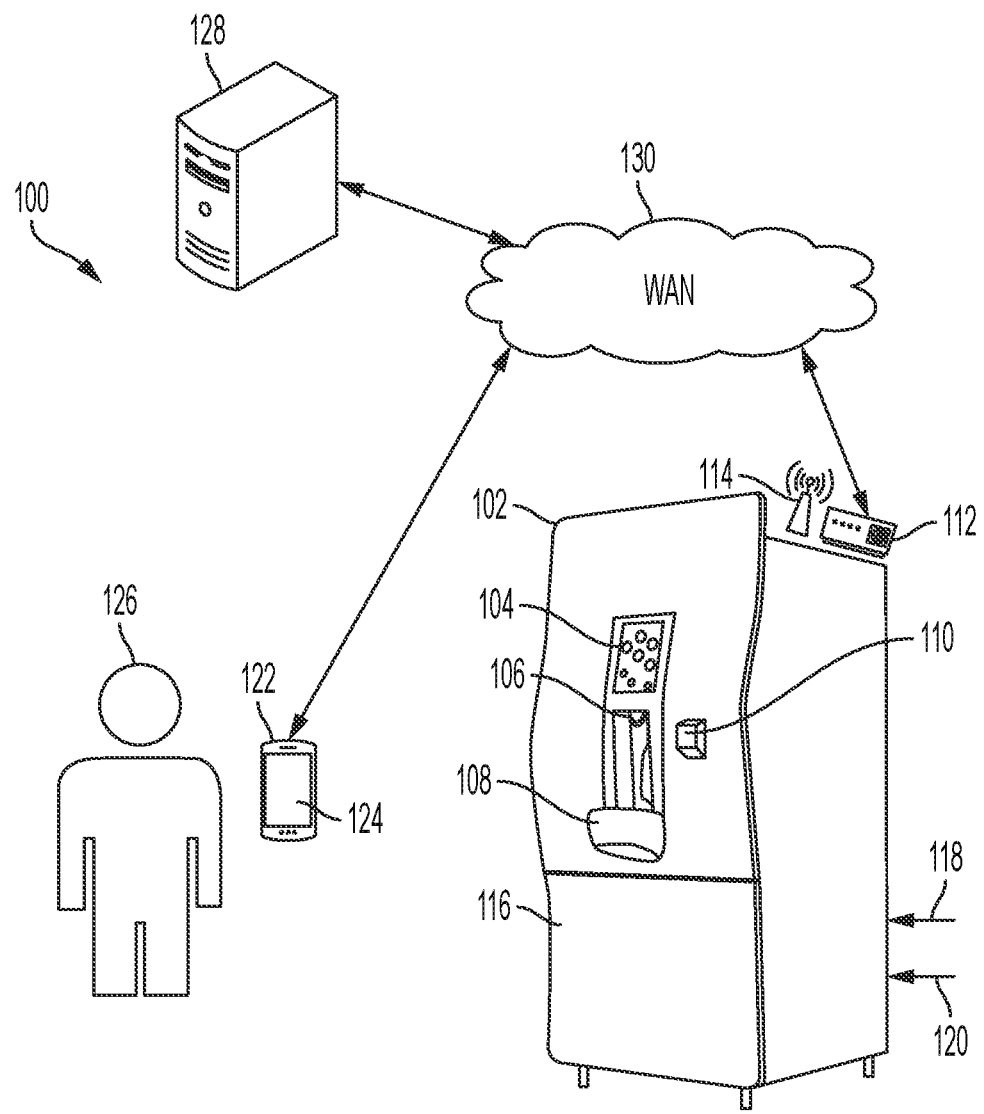
FIG. 1 illustrates an exemplary system for remote order authentication on a kiosk according to various embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Kiosks, such as beverage dispensers, vending machines, Wi-Fi access point terminals, and the like, provide products or services upon receiving payment. Many such kiosks may have a companion mobile application that facilitates identifying the location of the kiosks. Increasingly, the companion mobile application may additionally facilitate remote ordering of the products or services offered by a kiosk. However, challenges exist for ensuring that a consumer is able to easily access the products or services that were ordered remotely from the mobile application upon arriving at the kiosk location. Additionally, through the use of wireless communications technologies, it is not always readily apparent or ascertainable whether a particular consumer in a queue of people at a kiosk is an individual actually addressing the kiosk or one or more consumers back in the queue—sometimes referred to as the queuing problem.

A first authentication process includes providing a list of pre-paid orders on a kiosk. A consumer is then able to select their order on the kiosk so as to receive the product or service that was remotely paid for via a mobile application. However, because the pre-paid order list is available for inspection to all consumers at the kiosk, authentication of the consumer selecting the order is performed. In one implementation, the consumer is authenticated based upon sending an order authentication notification to the mobile application that completed the order. The authentication notification allows a user of the mobile application to provide an authentication reply, for example upon selecting a button in the mobile application or texting an authorization message to a designated number. If the individual that completed the pre-paid order did not select the order from the list, an authentication reply may be withheld or otherwise provided to indicate that the order should not be fulfilled at the kiosk. Otherwise, if the user of the mobile application provides a positive authentication reply, the kiosk is unlocked to supply the product or service that was ordered remotely through the mobile application.

In another implementation, the consumer is authenticated by providing a personal identification number (PIN) that is associated with the order or associated with a user of the mobile application. The kiosk can verify the PIN, such as through an authentication request to a server that maintains order information or profile information of users. Upon verification of the PIN, the kiosk is unlocked to supply the product or service that was ordered remotely through the mobile application. This authentication implementation enables a consumer to interact with the kiosk to receive the previously ordered product or service without having to access their mobile phone or mobile application that was used to place the order.

A second authentication process includes having a user of the mobile application send an access request message through the mobile application to the kiosk. Based on the access request message, the kiosk is unlocked to supply the product or service that was ordered remotely through the mobile application. Accordingly, as opposed to having a publicly available list of orders accessible from the kiosk, the user of the mobile application is in control of when to initiate unlocking the kiosk.

These and other features are described in various examples detailed below with reference to the accompanying drawings. While the examples below are provided with respect to a fountain beverage vendor, these teachings can be readily applied to other types of kiosks, such as vending machines, and the like.

Described herein are example systems and methods for controlling a beverage dispensing system (such as a Coca-Cola® Freestyle®, traditional fountain dispenser, or traditional fountain dispenser with micro-ingredients). For example, a beverage dispensing system (which may include one or more macro-ingredients and/or one or more micro-ingredients) combines macro-ingredients (such as sweeteners, water, or carbonated water) and/or micro-ingredients (such as high intensity sweeteners, flavorings, food acids, or additives) to create a finished beverage. Such micro-dosing functionality may increase the dispensing capabilities of the beverage dispensing system to deliver a large variety of beverages and improve the quality of the beverage dispensed by the beverage dispensing system.

Generally described, the macro-ingredients may have reconstitution ratios in the range from full strength (no dilution) to about six (6) to one (1) (but generally less than about ten (10) to one (1)). As used herein, the reconstitution ratio refers to the ratio of diluent (e.g., water or carbonated water) to beverage ingredient. Therefore, a macro-ingredient with a 5:1 reconstitution ratio refers to a macro-ingredient that is to be dispensed and mixed with five parts diluent for every part of the macro-ingredient in the finished beverage. Many macro-ingredients may have reconstitution ratios in the range of about 3:1 to 5.5:1, including 4.5:1, 4.75:1, 5:1, 5.25:1, 5.5:1, and 8:1 reconstitution ratios.

The macro-ingredients may include sweeteners such as sugar syrup, HFCS ("High Fructose Corn Syrup"), FIS ("Fully Inverted Sugar"), MIS ("Medium Inverted Sugar"), mid-calorie sweeteners comprised of nutritive and non-nutritive or high intensity sweetener blends, and other such nutritive sweeteners that are difficult to pump and accurately meter at concentrations greater than about 10:1—particularly after having been cooled to standard beverage dispensing temperatures of around 35-45° F. An erythritol sweetener may also be considered a macro-ingredient sweetener when used as the primary sweetener source for a beverage, though typically erythritol will be blended with other sweetener sources and used in solutions with higher reconstitution ratios such that it may be considered a micro-ingredient as described below.

The macro-ingredients may also include traditional BIB ("bag-in-box") flavored syrups (e.g., COCA-COLA bag-in-box syrup) which contain all of a finished beverage's sweetener, flavors, and acids that when dispensed is to be mixed with a diluent source such as plain or carbonated water in ratios of around 3:1 to 6:1 of diluent to the syrup. Other typical macro-ingredients may include concentrated extracts, purees, juice concentrates, dairy products or concentrates, soy concentrates, and rice concentrates.

The macro-ingredient may also include macro-ingredient base products. Such macro-ingredient base products may include the sweetener as well as some common flavorings, acids, and other common components of a plurality of different finished beverages. However, one or more additional beverage ingredients (either micro-ingredients or macro-ingredients as described herein) other than the diluent are to be dispensed and mix with the macro-ingredient base product to produce a particular finished beverage. In other words, the macro-ingredient base product may be dispensed and mixed with a first micro-ingredient non-sweetener flavor component to produce a first finished beverage. The same macro-ingredient base product may be dispensed and mixed with a second micro-ingredient non-sweetener flavor component to produce a second finished beverage.

The macro-ingredients described above may be stored in a conventional bag-in-box container in, at and/or remote from the dispenser. The viscosity of the macro-ingredients may range from about 1 to about 10,000 centipoise and generally over 100 centipoises or so when chilled. Other types of macro-ingredients may be used herein.

The micro-ingredients may have reconstitution ratios ranging from about ten (10) to one (1) and higher. Specifically, many micro-ingredients may have reconstitution ratios in the range of about 20:1, to 50:1, to 100:1, to 300:1, or higher. The viscosities of the micro-ingredients typically range from about one (1) to about six (6) centipoise or so, but may vary from this range. In some instances, the viscosities of the micro-ingredients may be forty (40) centipoise or less. Examples of micro-ingredients include natural or artificial flavors; flavor additives; natural or artificial colors; artificial sweeteners (high potency, nonnutritive, or otherwise); antifoam agents, nonnutritive ingredients, additives for controlling tartness, e.g., citric acid or potassium citrate; functional additives such as vitamins, minerals, herbal extracts, nutraceuticals; and over the counter (or otherwise) medicines such as pseudoephedrine, acetaminophen; and similar types of ingredients. Various acids may be used in micro-ingredients including food acid concentrates such as phosphoric acid, citric acid, malic acid, or any other such common food acids. Various types of alcohols may be used as either macro- or micro-ingredients. The micro-ingredients may be in liquid, gaseous, or powder form (and/or combinations thereof including soluble and suspended ingredients in a variety of media, including water, organic solvents, and oils). Other types of micro-ingredients may be used herein.

Typically, micro-ingredients for a finished beverage product include separately stored non-sweetener beverage component concentrates that constitute the flavor components of the finished beverage. Non-sweetener beverage component concentrates do not act as a primary sweetener source for the finished beverage and do not contain added sweeteners, though some non-sweetener beverage component concentrates may have sweet tasting flavor components or flavor components that are perceived as sweet in them. These non-sweetener beverage component concentrates may include the food acid concentrate and food acid-degradable (or non-acid) concentrate components of the flavor, such as described in commonly owned U.S. patent application Ser. No. 11/276,553, entitled "Methods and Apparatus for Making Compositions Comprising and Acid and Acid Degradable Component and/or Compositions Comprising a Plurality of Selectable Components," which is herein incorporated by reference in its entirety. As noted above, micro-ingredients may have reconstitution ratios ranging from about ten (10) to one (1) and higher, where the micro-ingredients for the separately stored non-sweetener beverage component concentrates that constitute the flavor components of the finished beverage typically have reconstitution ratios ranging from 50:1, 75:1, 100:1, 150:1, 300:1, or higher.

For example, the non-sweetener flavor components of a cola finished beverage may be provided from separately stored first non-sweetener beverage component concentrate and a second non-sweetener beverage component concentrate. The first non-sweetener beverage component concentrate may comprise the food acid concentrate components of the cola finished beverage, such as phosphoric acid. The second non-sweetener beverage component concentrate may comprise the food acid-degradable concentrate components of the cola finished beverage, such as flavor oils that would react with and impact the taste and shelf life of a non-sweetener beverage component concentrate were they to be stored with the phosphoric acid or other food acid concentrate components separately stored in the first non-sweetener component concentrate. While the second non-sweetener beverage component concentrate does not include the food acid concentrate components of the first non-sweetener beverage component concentrate (e.g., phosphoric acid), the second non-sweetener beverage component concentrate may still be a high-acid beverage component solution (e.g., pH less than 4.6).

A finished beverage may have a plurality of non-sweetener concentrate components of the flavor other than the acid concentrate component of the finished beverage. For example, the non-sweetener flavor components of a cherry cola finished beverage may be provided from the separately stored non-sweetener beverage component concentrates described in the above example as well as a cherry non-sweetener component concentrate. The cherry non-sweetener component concentrate may be dispensed in an amount consistent with a recipe for the cherry cola finished beverage. Such a recipe may have more, less, or the same amount of the cherry non-sweetener component concentrate than other recipes for other finished beverages that include the cherry non-sweetener component concentrate. For example, the amount of cherry specified in the recipe for a cherry cola finished beverage may be more than the amount of cherry specified in the recipe for a cherry lemon-lime finished beverage to provide an optimal taste profile for each of the finished beverage versions. Such recipe-based flavor versions of finished beverages are to be contrasted with the addition of flavor additives or flavor shots as described below.

Other typical micro-ingredients for a finished beverage product may include micro-ingredient sweeteners. Micro-ingredient sweeteners may include high intensity sweeteners such as aspartame, Ace-K, steviol glycosides (e.g., Reb A, Reb M), sucralose, saccharin, or combinations thereof. Micro-ingredient sweeteners may also include erythritol when dispensed in combination with one or more other sweetener sources or when using blends of erythritol and one or more high intensity sweeteners as a single sweetener source.

Other typical micro-ingredients for supplementing a finished beverage product may include micro-ingredient flavor additives. Micro-ingredient flavor additives may include additional flavor options that can be added to a base beverage flavor. The micro-ingredient flavor additives may be non-sweetener beverage component concentrates. For example, a base beverage may be a cola flavored beverage, whereas cherry, lime, lemon, orange, and the like may be added to the cola beverage as flavor additives, sometimes referred to as flavor shots. In contrast to recipe-based flavor versions of finished beverages, the amount of micro-ingredient flavor additive added to supplement a finished beverage may be consistent among different finished beverages. For example, the amount of cherry non-sweetener component concentrate included as a flavor additive or flavor shot in a cola finished beverage may be the same as the amount of cherry non-sweetener component concentrate included as a flavor additive or flavor shot in a lemon-lime finished beverage. Additionally, whereas a recipe-based flavor version of a finished beverage is selectable via a single finished beverage selection icon or button (e.g., cherry cola icon/button), a flavor additive or flavor shot is a supplemental selection in addition to the finished beverage selection icon or button (e.g., cola icon/button selection followed by a cherry icon/button selection).

As is generally understood, such beverage selections may be made through a touchscreen user interface or other typical beverage user interface selection mechanism (e.g., buttons) on a beverage dispenser. The selected beverage, including any selected flavor additives, may then be dispensed upon the beverage dispenser receiving a further dispense command through a separate dispense button on the touchscreen user interface or through interaction with a separate pour mechanism such as a pour button (electromechanical, capacitive touch, or otherwise) or pour lever.

In the traditional BIB flavored syrup delivery of a finished beverage, a macro-ingredient flavored syrup that contains all of a finished beverage's sweetener, flavors, and acids is mixed with a diluent source such as plain or carbonated water in ratios of around 3:1 to 6:1 of diluent to the syrup. In contrast, for a micro-ingredient delivery of a finished beverage, the sweetener(s) and the non-sweetener beverage component concentrates of the finished beverage are all separately stored and mixed together about a nozzle when the finished beverage is dispensed. Example nozzles suitable for dispensing of such micro-ingredients include those described in commonly owned U.S. provisional patent application Ser. No. 62/433,886, entitled "Dispensing Nozzle Assembly," PCT patent application Ser. No. PCT/US15/026657, entitled "Common Dispensing Nozzle Assembly," U.S. Pat. No. 7,866,509, entitled "Dispensing Nozzle Assembly," or U.S. Pat. No. 7,578,415, entitled "Dispensing Nozzle Assembly," which are all herein incorporated by reference in their entirety.

In operation, the beverage dispenser may dispense finished beverages from any one or more of the macro-ingredient or micro-ingredient sources described above. For example, similar to the traditional BIB flavored syrup delivery of a finished beverage, a macro-ingredient flavored syrup may be dispensed with a diluent source such as plain or carbonated water to produce a finished beverage. Additionally, the traditional BIB flavored syrup may be dispensed with the diluent and one or more micro-ingredient flavor additives to increase the variety of beverages offered by the beverage dispenser.

Micro-ingredient-based finished beverages may be dispensed by separately dispensing each of the two or more non-sweetener beverage component concentrates of the finished beverage along with a sweetener and diluent. The sweetener may be a macro-ingredient sweetener and/or a micro-ingredient sweetener and the diluent may be water and/or carbonated water. For example, a micro-ingredient-based cola finished beverage may be dispensed by separately dispensing food acid concentrate components of the cola finished beverage, such as phosphoric acid, food acid-degradable concentrate components of the cola finished beverage, such as flavor oils, macro-ingredient sweetener, such as HFCS, and carbonated water. In another example, a micro-ingredient-based diet-cola finished beverage may be dispensed by separately dispensing food acid concentrate components of the diet-cola finished beverage, food acid-degradable concentrate components of the diet-cola finished beverage, micro-ingredient sweetener, such as aspartame or an aspartame blend, and carbonated water. As a further example, a mid-calorie micro-ingredient-based cola finished beverage may be dispensed by separately dispensing food acid concentrate components of the mid-calorie cola finished beverage, food acid-degradable concentrate components of the mid-calorie cola finished beverage, a reduced amount of a macro-ingredient sweetener, a reduced amount of a micro-ingredient sweetener, and carbonated water. By reduced amount of macro-ingredient and micro-ingredient sweeteners, it is meant to be in comparison with the amount of macro-ingredient or micro-ingredient sweetener used in the cola finished beverage and diet-cola finished beverage. As a final example, a supplemental flavored micro-ingredient-based beverage, such as a cherry cola beverage or a cola beverage with an orange flavor shot, may be dispensed by separately dispensing a food acid concentrate components of the flavored cola finished beverage, food acid-degradable concentrate components of the flavored cola finished beverage, one or more non-sweetener micro-ingredient flavor additives (dispensed as either as a recipe-based flavor version of a finished beverage or a flavor shot), a sweetener (macro-ingredient sweetener, micro-ingredient sweetener, or combinations thereof), and carbonated water. While the above examples are provided for carbonated beverages, they apply to still beverages as well by substituting carbonated water with plain water.

The various ingredients may be dispensed by the beverage dispenser in a continuous pour mode where the appropriate ingredients in the appropriate proportions (e.g., in a predetermined ratio) for a given flow rate of the beverage being dispensed. In other words, as opposed to a conventional batch operation where a predetermined amount of ingredients are combined, the beverage dispenser provides for continuous mixing and flows in the correct ratio of ingredients for a pour of any volume. This continuous mix and flow method can also be applied to the dispensing of a particular size beverage selected by the selection of a beverage size button by setting a predetermined dispensing time for each size of beverage.

FIG. 1 illustrates an exemplary system 100 for remote order authentication on a kiosk 102 according to various embodiments of the disclosure. As shown, the kiosk 102 is a beverage vendor, such as a flavored water vendor. Other types of fountain beverage vendors or other types of kiosks may be used herein.

The beverage vendor 102 includes a user interface 104, a nozzle 106, a vessel support platform 108, and a payment module 110. The user interface 104 is configured to display various user interface screens to a user to select a beverage product to be dispense from the beverage vendor 102. As discussed in more detail below, the selected beverage product may be a pre-paid beverage product order. The nozzle is configured to dispense the selected beverage product by dispensing one or more beverage ingredients into a vessel (not shown) resting on the vessel support platform 108. The payment module 110 facilitates payment of beverages selected from the user interface 104 in a walk-up order. That is, the walk-up order is not a pre-paid beverage product order, but is instead an order whose payment is facilitated through the beverage vendor 102.

The beverage vendor 102 also includes a product ingredient compartment 116 that is accessible through a locked door. The product ingredient compartment 116 houses one or more beverage ingredients. For example, the product ingredient compartment 116 may house one or more beverage macro-ingredients and/or micro-ingredients. The beverage vendor 102 also includes a power input 118, such as a power cord connected to a power outlet. The beverage vendor 102 also includes a water inlet 120 connected to a water source, such as a municipal water source. The product ingredient compartment 116 may also house a $CO_2$ supply and a carbonator for producing carbonated water from the water inlet and $CO_2$ from the $CO_2$ supply. A separate fluidic circuit with a fluidic supply line and one or more pumps and/or valves is connected between the nozzle 106 and each of the product ingredients and water sources.

The beverage vendor 102 also includes a modem 112 and a beacon 114. As discussed in more detail below, the modem 112 is configured to establish communication through a wide area network (WAN) 130 to a beverage vendor server 128. For example, the modem 112 is a cellular modem, or a local area network (LAN) modem configured to connect to an access point of the WAN 130, such as a wireless or wired gateway (not shown). The beacon 114 is configured to broadcast a unique identifier (ID) that is assigned to a particular beverage vendor 102. For example, the beacon 114 is a Bluetooth low energy (BLE) beacon, or the like. While shown in FIG. 1 as externally mounted to the beverage vendor 102, the modem 112 and/or the beacon 114 may be housed internal to the beverage vendor 102.

A mobile device 122 of a user 126 is configured to receive a beacon signal broadcast by the beacon 114 with the unique ID for the beverage vendor 102. A mobile application 123 (not shown) installed on the mobile device 122 is configured to detect the beacon signal and receive the unique ID. As described in more detail below, the mobile application 123 is configured to locate the beverage vendor 102 and facilitate completion of a pre-paid beverage product order via communication over the WAN 130 with the beverage vendor server 128. Typically, the pre-paid beverage product order is completed at a location remote from the beverage vendor 102 and at a time prior to the user 126 coming into proximity of the beverage vendor 102. In some implementations, being within proximity of the beverage vendor 102 is at a location within a broadcast range of the beacon 114. In other words, for various implementations described herein, a mobile device 122 is determined to be proximate to the beverage vendor 102 upon receiving the beacon signal with the unique ID from the beacon 114.

FIG. 2 illustrates an exemplary remote ordering process 200 according to various embodiments of the disclosure. The remote ordering process 200 is executed by the mobile application 123 on the mobile device 122. The remote ordering process 200 includes finding a desired beverage vendor 202, selecting a desired beverage to be dispensed from the desired beverage vendor, 204, paying for the beverage order 206, and filling the beverage order at the desired beverage vendor 208. While shown in a particular order, the order of the steps shown in the remote ordering process 200 may have a different order of events. For example, steps 202 and 204 may be reversed, or step 202 may take place after step 206. Other variations are contemplated by this disclosure.

FIGS. 3A-3D illustrate exemplary mobile application 123 user interface screens 300 for the remote ordering process 200 according to various embodiments of the disclosure. The user interface screens 300 are displayable by the mobile application 123 on the display 124 of the mobile device 122. The user interface screens 300 include a separate user interface screen for each step in the remote ordering process 200. That is, each of steps 202-208 are facilitated through the user interface screens 302-308, respectively. As shown, each of the user interface screens 300 include a navigation bar 310 with selectable options for navigating to different ones of the user interface screens 300. For example, a navigation icon in the navigation bar 310 may be selected to navigate to a beverage vendor locator screen 302 displayed on the display 124 of the mobile device 122 by the mobile application 123.

The beverage vendor locator screen 302 shown in FIG. 3A includes a map 311 of an area of interest with an icon 312 showing the location of an available beverage vendor 102. Upon selection of the icon 312 or upon selection of a menu icon in the navigation bar 310, a product menu screen 304, such as shown in FIG. 3B, is displayed on the display 124 of the mobile device 122 by the mobile application 123. When navigating to the product menu screen 304 from the icon 312, the menu screen 304 is populated with beverage products that are available to be dispensed at the beverage vendor 102 at the location shown by the icon 312 in the map 311. Additionally, the menu screen 304 may be updated to indicate an inventory status of each of the products at the selected beverage vendor 102. For example, if a product is sold out, the menu screen 304 may indicate that the product is sold out at the selected beverage vendor 102 by graying out the sold-out product selection button on the menu screen 304. Alternatively, sold-out products may be removed from the product menu screen 304.

Upon a desired beverage product being selected from the product menu screen 304, a purchase screen 306 is displayed on the display 124 of the mobile device 122 by the mobile application 123. The purchase screen 306 includes a purchase button 316 to complete a purchase of the selected beverage product. For example, the purchase may be completed using a credit card or other payment credentials previously registered with the mobile application 123. Alternatively, selection of the purchase button 316 may launch a payment portal for a third-party payment process. As shown in FIG. 3C, the purchase screen 306 includes a selected product icon 319 to indicate the beverage product that was selected and is about to be purchased. The purchase screen 306 may also include one or more product selection buttons 318 for changing a desired beverage product to be purchased.

Upon completing the purchase, a product order screen 308 is displayed on the display 124 of the mobile device 122 by the mobile application 123. The product order screen 308 includes a purchased product icon 320 that shows the ordered beverage product. The product order screen 308 also includes a product location button 322 for navigating to the beverage vendor locator screen 302. When navigating to the beverage vendor locator screen 302 from the product order screen 308, only beverage vendors that are available to dispense the ordered beverage product are shown on the map 311. The product order screen 308 also includes a pour button 324 that may be used in the authentication processes described below with reference to FIGS. 5-7. Pending orders, that is orders that have been purchased, but not yet filled at the beverage vendor 102, may be navigated to from the navigation bar 310.

Figures 4A, 4B:
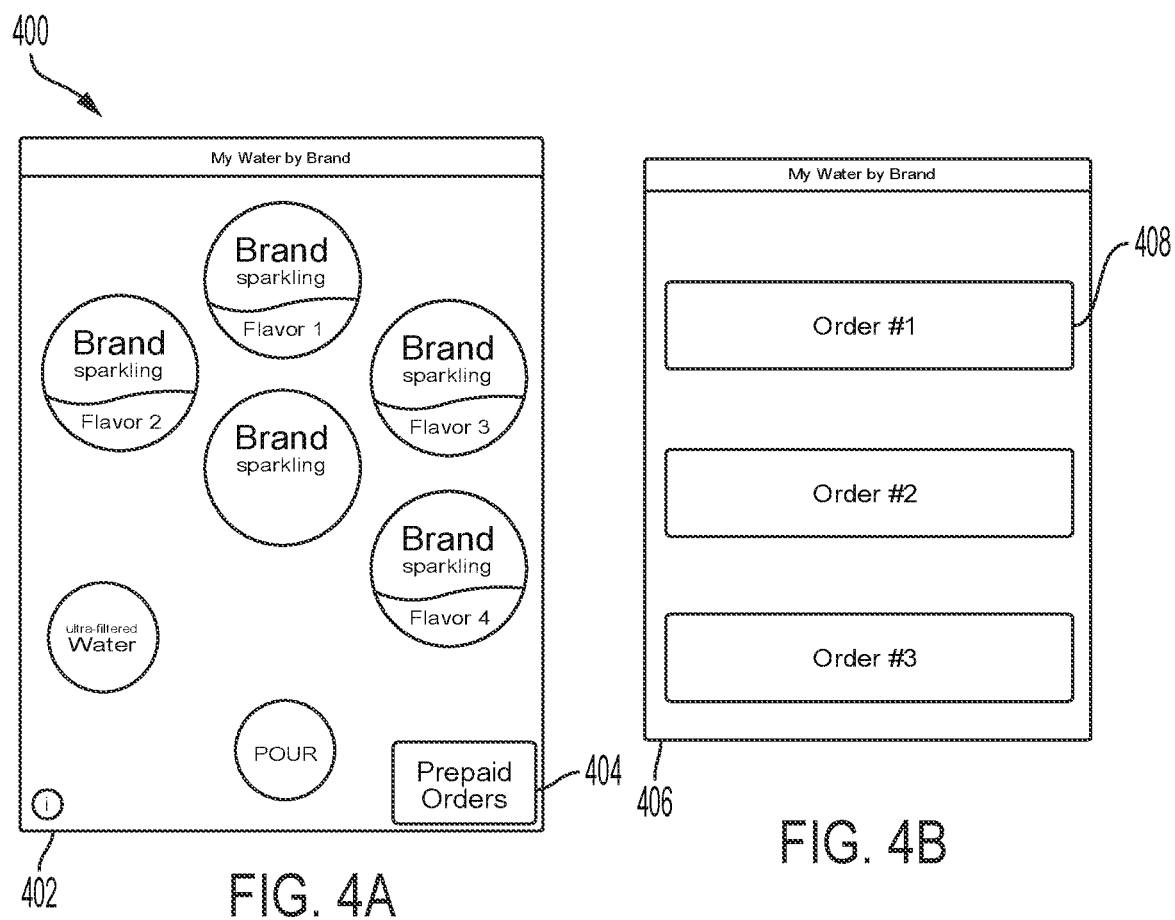
FIGS. 4A-4C illustrate exemplary kiosk user interfaces for the remote order authentication on the kiosk according to various embodiments of the disclosure.
Figure 4C:
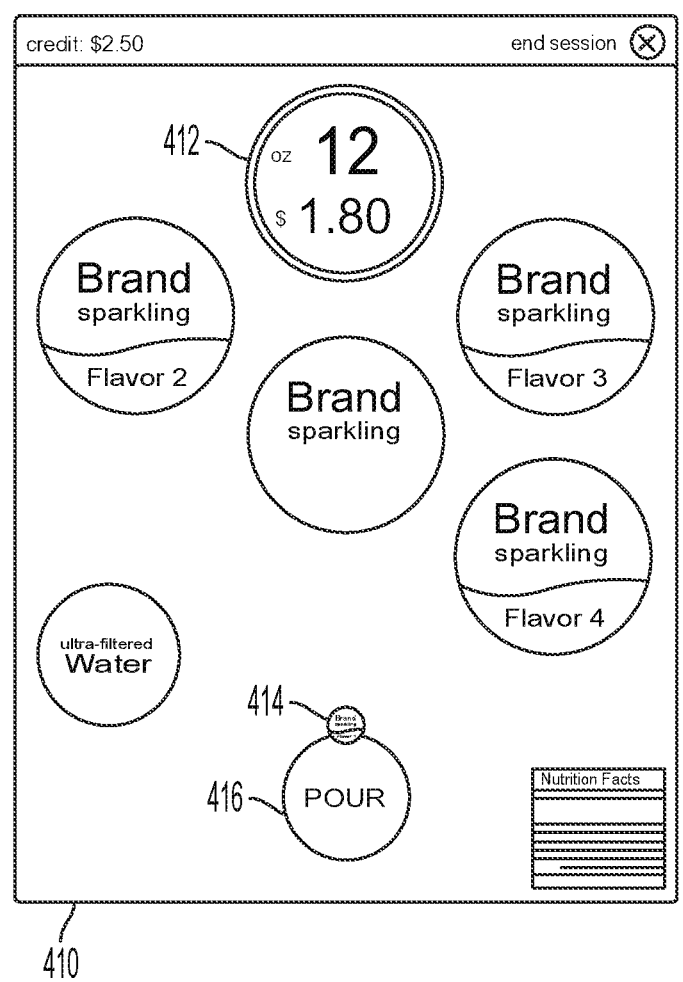

FIGS. 4A-4C illustrate exemplary kiosk user interfaces 400 for the remote order authentication on the kiosk according to various embodiments of the disclosure. The user interface screens 400 are displayable by the beverage vendor 102 on the display 104. In some implementations, the display 104 is a touch screen display. A home page screen 402 is displayed on the display 104 to initiate transaction on the beverage vendor 104. As shown in FIG. 4A, the home page screen 402 include various selectable icons for facilitating a walk-up order, as described above. The home page screen 402 also includes a selectable pre-paid orders icon 404 to navigate to a list of pre-paid orders that have been made through the mobile application 123 of the mobile device 122.

Upon receiving a selection of the pre-paid order icon 404, the display 104 is updated to show a pre-paid orders screen 406, such as shown in FIG. 4B. The pre-paid orders screen 406 shows a list of pre-paid orders, each associated with a selectable order icon 408. The selectable order icon 408 including an order identifier that indicates an order number, account identifier, or other unique identifier recognizable to the user 126 to identify their pre-paid order. For example, the unique identifier may also be a name of the user 126, a user name of the user 126, a profile picture of the user 126, or other such personally recognizable information.

Upon receiving a selection of the selectable order icon 408, an authentication process, described in detail below, is performed to authenticate that the pre-paid order is accessible to the user 126. That is, the authentication process ensures that an unauthorized person is not able to select the selectable order icon 408 and dispense a beverage from the beverage vendor 102.

Upon authenticating the user 126, the display 104 is updated to show a pour screen 410, such as shown in FIG. 4C. The pour screen includes various icons and other information to facilitate pouring a beverage from the beverage vendor 102. For example, the pour screen includes a dispense gauge 412 that indicates an updatable cost of the dispensed beverage and an amount of the beverage dispensed. In the example shown in FIG. 4C, the dispense gauge 412 shows that 12 oz. of a beverage have been dispensed from the beverage vendor 102 during a dispense operation and costs a total of $1.80. The pour screen 410 also includes a beverage indicator 414 that shows an indication of the selected or ordered beverage product that is being dispensed. The pour screen 410 also includes a pour button 416 for initiating a dispense of the beverage from the nozzle 106 of the beverage vendor 102. For example, as long as the pour button 416 is held down, the beverage vendor 102 will dispense the selected beverage from the nozzle 106, up to a predetermined maximum amount, in some implementations. Alternatively, a pour button or lever (not shown) separate from the display 104 may be used to initiate a dispense of the selected beverage from the nozzle 106.

Figure 5:
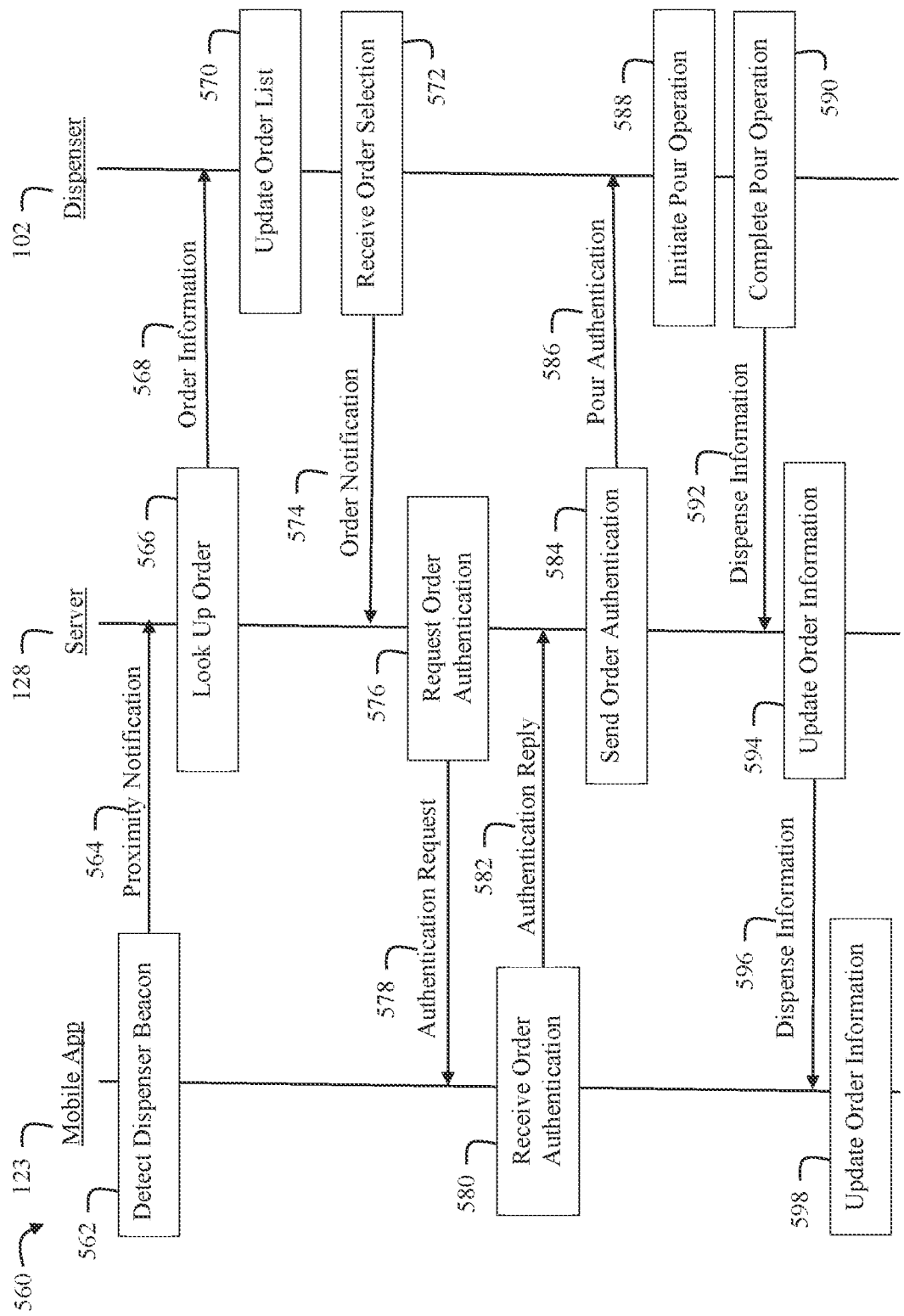
FIG. 5 illustrates an exemplary sequence diagram for the remote order authentication on the kiosk according to various embodiments of the disclosure.

FIG. 5 illustrates an exemplary sequence diagram 560 for remote order authentication on a kiosk, such as the beverage vendor 102, according to various embodiments of the disclosure. The sequence diagram 560 takes place after the user 126 has used the mobile application 123 to remotely place an order for a beverage product from the beverage vendor 102. At 562, the mobile application 123 detects the unique ID of the beacon 114 of beverage vendor 102. At 564, the mobile application 123 sends a proximity notification 564 to the server 128 via the WAN 130. The proximity notification includes the unique ID of the beacon 114 as well as order identifying information. The order identifying information may include an order number, a profile identifier of the user 126 or the mobile application 123, or other such identifier usable by the server 128 to look up a pending order associated with the mobile application 123 at 566. As noted above a pending order is an order that has been purchased, but not yet filled at the beverage vendor 102. If no pending orders are found by the server 128, the process ends. The server 128 maintains or has access to a database of pending orders available for fulfillment at a plurality of beverage vendors 102. For example, the server 128 may be the same server that the mobile application 123 uses to complete a purchase of an order.

Upon identifying a pending order, the server 128 communicates order information of the proximate mobile application 123 to the beverage vendor 102 at 568. The order information includes the order identifier shown by the selectable order icon 408 in FIG. 4B. The order information may also include dispenser configuration information usable by the beverage vendor 102 to configure one or more pumps and/or valves to dispense a beverage selected for the order from the nozzle 106 of the beverage vendor 102. For example, the dispenser configuration information may include an indication of the beverage selected for the order as well as a set amount of beverage to be dispensed or a maximum amount of beverage that can be dispensed with for the order.

At 570, the dispenser 102 updates a list of pending orders maintained at the dispenser 102. In order to minimize the number of orders maintained on the list to make navigation of the pre-paid orders screen 406 easier, only certain orders are added to the list of pending orders maintained at the dispenser 102, and the orders in the list of pending orders are periodically culled. For example, as discussed above, the list of pending orders may only contain pending orders associated with mobile devices that are proximate to the beverage vendor 102.

Additionally, the list of pending orders may also contain orders which a user has designated to be dispensed at the beverage vendor 102. For example, upon selecting the icon 312 shown in FIG. 3A of a particular beverage vendor 102, the user 126 may complete the purchase of an order. Upon completing the purchase of the order, the server 128 communicates order information to the beverage vendor 102 similar to step 568 discussed above. Alternatively, after completing purchase of an order, upon selecting the product location button 322 shown in FIG. 3D and selecting a desired beverage vendor 102 to fulfill the order, the server 128 communicates order information to the beverage vendor 102. Other variations or changes to the order of events may be used.

Likewise, the list of pending orders maintained at the dispenser 102 may be periodically culled. For example, upon completing a dispense operation, the order associated with the completed dispense operation may be removed from the list of pending orders. As another example, the order may be removed from the list of pending orders if the order is not fulfilled within a threshold time period.

Similarly, if the mobile device 122 is determined to no longer be proximate to the beverage vendor 102, the order associated with the mobile application 123 may be removed from the list of pending orders. The mobile device 122 may be determined to no longer be proximate to the beverage vendor 102 if the mobile device 123 does not receive the unique ID of the beacon 114 within a threshold period of time. Alternatively, upon detecting the unique ID of the beacon 114, a geofence may be established within a threshold distance of the beverage vendor 102. Upon the mobile device 122 moving outside of the threshold distance established by the geofence, the mobile device 122 may be determined to no longer be proximate to the beverage vendor 102. In either case, upon determining that the mobile device 122 is no longer proximate to the beverage vendor 102, the mobile application 123 may send a message to the server 128 indicating the lack of continued proximity to the beverage vendor 102. In turn, the server 128 may send a message to the beverage vendor 102 to remove the order from the list of pending orders. Other variations for determining whether the mobile device 122 is no longer proximate to the beverage vendor 102 may be used.

Other triggers may be used to determine when to remove orders from the list of pending orders.

At 572, the beverage vendor 102 receives a selection of the order icon 408 from the user 126 after navigating through the user interfaces 400 of the beverage vendor 102 as discussed above. Upon receiving the selection of the order icon 408, at 574, the dispenser 102 sends an order notification message to the server 128 to authenticate the user 126 for the selected order.

Upon receiving the order notification message, at 578, the server 128 sends an authentication request to the mobile application 123. The authentication request message may be communicated to the user 126 of the mobile device 124 by displaying a notification from the mobile application 123. In some implementations, upon the user 126 selecting the displayed notification from the mobile application 123, the mobile application may automatically navigate to the product order screen 308 shown in FIG. 3D or a similar such screen. At 580, the mobile application 123 receives an order authentication upon the user 126 selecting the pour button 324, for example.

In some implementations, the server 128 may send the authentication request message to the mobile device 122 through an application notification other than the mobile application 123. For example, the server 128 may send the authentication request message via a SMS message to the mobile device 122. In such implementations, the order authentication may be received through the other notification application. For example, the user 126 may reply "P" to the notification SMS message to authorize pouring the ordered beverage at the beverage vendor 102. Other application notifications may be used.

In the event that the user 126 is not at the beverage vendor 102 or their order is otherwise inadvertently selected, a do not pour button (not shown) or other feedback may be provided by the mobile application 123 or other notification application to the server 128 indicating that the order should not be poured at the beverage vendor 102. In some implementations, the mobile application 123 may send the do not pour message automatically after a predetermined time threshold.

Otherwise, upon receiving the order authentication at 580, the mobile application 123 sends an authentication reply 582 to the server 128 at 582. Upon receiving the authentication reply 582, the server 128 sends a pour authentication message to the beverage vendor 102 at 586. If not already received upon receiving the order information message at 568, the pour authentication message may include the dispenser configuration information usable by the beverage vendor 102 to configure one or more pumps and/or valves to dispense a beverage selected for the order from the nozzle 106 of the beverage vendor 102. At 588, the pour operation is initiated, for example by navigating the beverage vendor user interfaces 400 to the pour screen 410. The user 126 may then dispense the selected beverage from the beverage vendor 102 into a vessel (not shown), as described above.

Upon completing the pour operation at 590, the beverage vendor 102 sends a dispense information message 592 to the server 128. For example, the dispense information message may include one or more of the beverage dispensed, the amount of the beverage dispensed (e.g., in fluid ounces), and a total cost (e.g., in dollars) of the dispensed beverage. At 594, the server 128 may update the order information to indicate that the order is no longer pending, but is now fulfilled. This may additionally include closing out any financial transaction pre-authorizations to charge the total cost received from the beverage vendor 102.

At 596, the server 128 may also send a dispense information message to the mobile application 123. At 598, the mobile application 123 may update the order information to indicate that the order is no longer pending. Additionally, the mobile application 123 may automatically update a tracked volume of fluids consumed based on the amount of the beverage dispensed from the beverage vendor 102.

Figure 6:
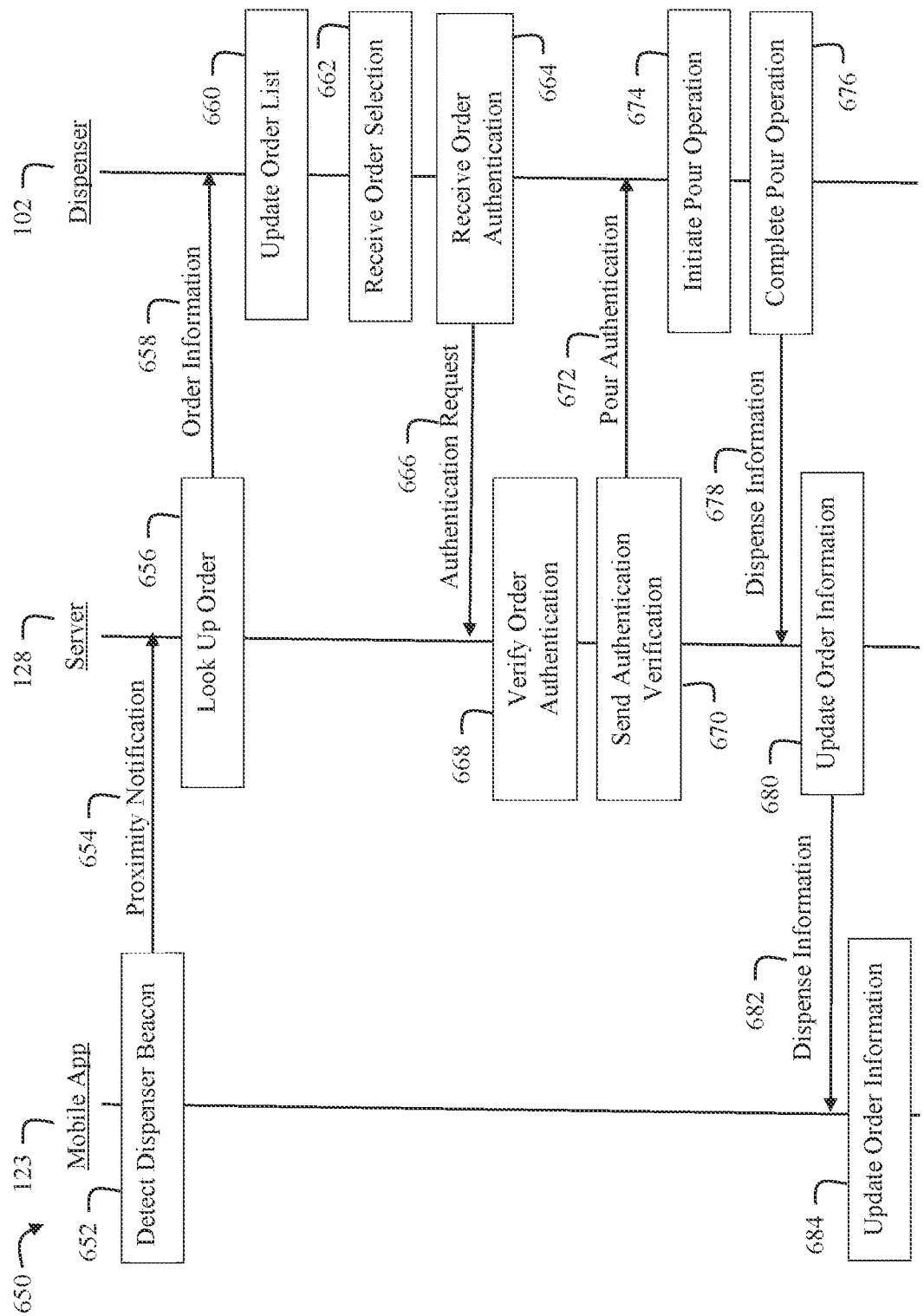
FIG. 6 illustrates an exemplary alternative sequence diagram for the remote order authentication on the kiosk according to various embodiments of the disclosure.

FIG. 6 illustrates an exemplary alternative sequence diagram 650 for the remote order authentication on the kiosk, such as the beverage vendor 102, according to various embodiments of the disclosure. As above, the sequence diagram 650 takes place after the user 126 has used the mobile application 123 to remotely place an order for a beverage product from the beverage vendor 102. Steps 652-662 and steps 674-686 are substantially the same as steps 562-572 and steps 586-598, respectively. Accordingly, in the interest of brevity, the description of the operation of these steps is not repeated herein, but instead reference is made to the description of the corresponding steps discussed above.

The sequence diagram 650 is substantially similar to the sequence diagram 560 described above, except the authentication procedure includes receiving a personal identification number (PIN) code at the display 104 of the beverage vendor 102 to authenticate the order. Therefore, the sequence diagram 650 allows for the authentication of pre-paid orders through only interaction with the beverage vendor 102. The user 126 does not need to access their mobile device 122 or otherwise load or interact with the mobile application 123 that was used to place the order.

Upon receiving the selection of the order icon 408, at 662, the dispenser 102 requests an order authentication PIN. For example, the beverage vendor 102 may show a PIN entry screen (not shown) for receiving a PIN code from the user 126. The PIN may be specific to the order (e.g., set by the user 126 when placing the order via the mobile application 123) or the PIN may be specific to the user (e.g., associated with a profile of the user 126 maintained by the mobile application 123 and/or the server 128). In some implementations, the beverage vendor 102 may authenticate the PIN code locally. For example, an authentic PIN code may be communicated to the beverage vendor 102 from the server 128 along with the order information at 658.

Otherwise, at 666, the beverage vendor 102 sends an authentication request to the server 128 to authenticate the user 126 for the selected order. The authentication request may include the PIN received at 664. At 668, the server 128 authenticates the PIN. If an invalid PIN is received, the beverage vendor 102 may be notified by the server 128 and a request for a valid PIN may again be displayed as in 664, described above. Upon receiving a threshold number of invalid PINs, the order may be canceled and removed from the list of pending orders maintained by the beverage vendor 102.

Otherwise, the server 128 sends an authentication verification at 670. That is, a pour authentication message is communicated from the server 128 to the beverage vendor 102 at 672. The pour authentication message may include an authorization code or other message interpreted by the beverage vendor 102 to allow for the dispense of the order. Upon receiving the pour authentication message, the beverage vendor 102 may initiate the pour operation 674, as described above.

Figure 7:
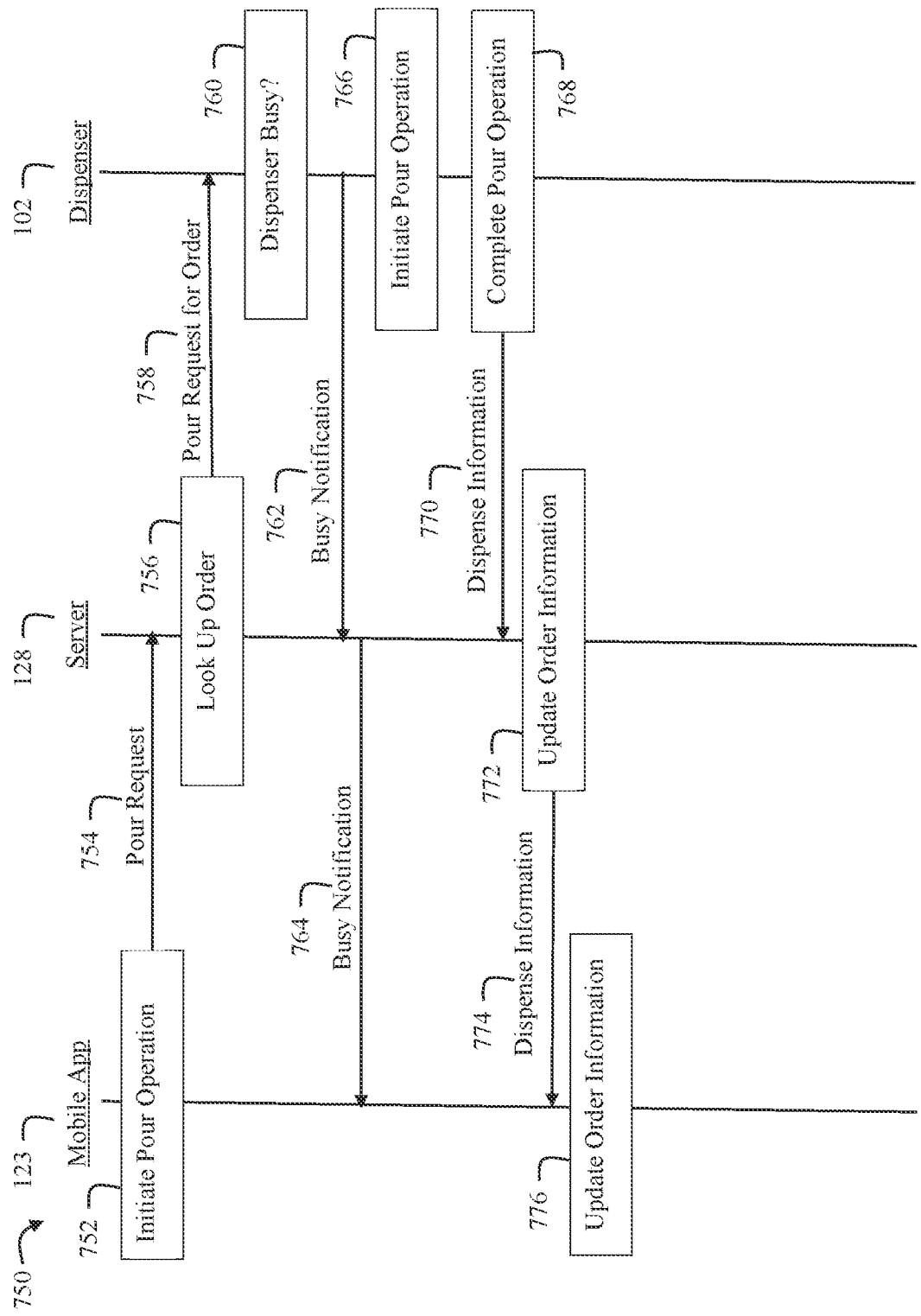
FIG. 7 illustrates an exemplary second alternative sequence diagram for the remote order authentication on the kiosk according to various embodiments of the disclosure.

FIG. 7 illustrates an exemplary second alternative sequence diagram 750 for the remote order authentication on the kiosk, such as the beverage vendor 102, according to various embodiments of the disclosure. As above, the sequence diagram 750 takes place after the user 126 has used the mobile application 123 to remotely place an order for a beverage product from the beverage vendor 102. Steps 766-768 are substantially the same as steps 588-598, respectively. Accordingly, in the interest of brevity, the description of the operation of these steps is not repeated herein, but instead reference is made to the description of the corresponding steps discussed above.

In the sequence diagram 750, as opposed to initiating an authentication process through the pending order list on the beverage vendor 102, the authentication process is initiated by the user 126 through the mobile application 122. That is, at 752, upon the user 126 addressing the beverage vendor 102, the user may initiate a pour operation for a pre-paid order on the beverage vendor through the mobile application 123. For example, the user 126 may navigate to the product order screen 308 on the mobile application 123. Upon receiving a selection of the pour button 324, the mobile application 123 sends a pour request message to the server at 754. The pour request message may include a beverage vendor identifier in addition to the order identifying information discussed above. For example, the beverage vendor identifier may correspond to a beverage vendor associated with the icon 312 selected in the map 311.

The order identifying information may include an order number, a profile identifier of the user 126 or the mobile application 123, or other such identifier usable by the server 128 to look up a pending order associated with the mobile application 123 at 756. Upon identifying a pending order, the server 128 communicates a pour request for the order to the beverage vendor 102 at 758. The pour request includes dispenser configuration information usable by the beverage vendor 102 to configure one or more pumps and/or valves to dispense a beverage selected for the order from the nozzle 106 of the beverage vendor 102. For example, the dispenser configuration information may include an indication of the beverage selected for the order as well as a set amount of beverage to be dispensed or a maximum amount of beverage that can be dispensed with for the order.

At 760, the beverage vendor 102 determines whether it is currently busy. For example, if the beverage vendor 102 is currently fulfilling another pour operation, the beverage vendor 102 may send a busy notification 762 to the server 128. Accordingly, the server 128 may send a busy notification to the mobile application 123 at 764. For example, the busy notification may include a pop-up message displayed by the mobile application 123 that the beverage vendor 102 is currently busy and to retry once the user 126 is in the front of the line at the beverage vendor 102. Otherwise, if the beverage vendor is not determined to be busy a 760, a pour operation is initiated at 766.

Accordingly, to the above, the pending application provides for a user to be able to remotely order a product or service from a kiosk and securely initiate fulfillment of the product or service upon reaching the kiosk using an authentication procedure.

FIGS. 8A-8E illustrate exemplary mobile application 123 user interface screens 850 for the remote ordering process 200 according to various embodiments of the disclosure. The user interface screens 850 are displayable by the mobile application 123 on the display 124 of the mobile device 122. The user interface screens 850 include a separate user interface screen for each step in the remote ordering process 200. That is, each of steps 202-208 are facilitated through one or more of the user interface screens 852, 856, 860, 864, and 870.

A mobile application main screen 852 is shown in FIG. 8A for navigating to various screens of the mobile application 123, including the user interface screens 850. As shown, the main screen 852 include a navigation bar similar to that described above with reference to FIG. 8A. The main screen 854 additionally includes an order icon 854 for initiating a remote order. Upon selection of the order icon 854, a beverage vendor locator screen 856 is displayed on the display 124 of the mobile device 122 by the mobile application 123.

The beverage vendor locator screen 856 shown in FIG. 3B includes a map of an area of interest with a list of one or more locations within the area of interest with an available beverage vendor 102. Each of the locations in the list is selectable, such as location 858. Upon selection of the location 858, a product menu screen 860, such as shown in FIG. 8C, is displayed on the display 124 of the mobile device 122 by the mobile application 123. The menu screen 860 is populated with beverage products that are available to be dispensed at the beverage vendor 102 at the location 858. Additionally, the menu screen 860 may be updated to indicate an inventory status of each of the products at the selected beverage vendor 102. For example, if a product is sold out, the menu screen 860 may indicate that the product is sold out at the selected beverage vendor 102 by graying out the sold-out product selection button on the menu screen 860. Alternatively, sold-out products may be removed from the product menu screen 860.

Upon a desired beverage product being selected from the product menu screen 860, a purchase screen 864 is displayed on the display 124 of the mobile device 122 by the mobile application 123. The purchase screen 864 displays an indication of the product selected form the product menu screen 860 as well as a price for the selected product. For examples, the price may be displayed as a price per volume of the product dispensed from the beverage vendor 102. Other pricing models are contemplated by this disclosure, such as a flat fee amount for up to a maximum volume of product dispensed or crediting against a product subscription account. The purchase screen 864 includes a purchase button 866 to complete a purchase of the selected beverage product. For example, the purchase may be completed using a credit card or other payment credentials previously registered with the mobile application 123.

In various implementations, the mobile application 123 has a corresponding beverage vendor card stored in a secured mobile wallet application on the mobile device 122, such as APPLE PAY or GOOGLE PAY. Upon selection of the purchase button 866 a credit amount may be added to the beverage vendor card and a payment card associated with the secured mobile wallet application may be charged for the credit amount. Additionally, an indication of the selected product for the order may be added to the beverage vendor card. During completion of the payment, a payment icon 868 may be displayed on the purchase screen 864.

Upon completing the purchase, a product order screen 870 is displayed on the display 124 of the mobile device 122 by the mobile application 123. The product order screen 870 includes a purchased product icon that shows the ordered beverage product. The product order screen 308 also includes an address of the beverage vendor 102 associated with the selected location 858 as well as a product location button 872 for navigating to the beverage vendor 102 at the location 858. The product order screen 308 also includes a cancel order button 874 for optionally cancelling the order. Pending orders, that is orders that have been purchased, but not yet filled at the beverage vendor 102, as well as an order history may be navigated to from the navigation bar on the main screen 852.

FIGS. 9A-9D illustrate exemplary kiosk user interfaces 950 for the remote order authentication on the kiosk according to various embodiments of the disclosure. The user interface screens 950 are displayable by the beverage vendor 102 on the display 104. In some implementations, the display 104 is a touch screen display. A home page screen 952 is displayed on the display 104 to initiate transaction on the beverage vendor 104. As shown in FIG. 9A, the home page screen 952 include various selectable icons for facilitating a walk-up order, as described above. The home page screen 952 also includes a selectable pre-paid orders icon 954 to fulfill a remotely completed order that has been made through the mobile application 123 of the mobile device 122, such as via the user interface screens 850 described above.

Upon receiving a selection of the pre-paid order icon 954, the display 104 is updated to show a payment instruction screen 956, such as shown in FIG. 9B. The payment instruction screen 956 instructs an end-user to tap their mobile device 122 on the payment module 110 with a payment reader associated with the secured mobile wallet application. Upon initiating an information exchange between the mobile device 122 and the payment module 110, the display 104 is updated to show a payment processing screen 958, such as shown in FIG. 9C. During the information exchange between the mobile device 122 and the payment module 110, the credit amount added to the beverage vendor card as well as the indication of the selected product for the order is provided to the beverage vendor 102.

Upon successful information exchange between the mobile device 122 and the payment module 110, the display 104 is updated to show an order verification screen 960, such as shown in FIG. 9D. The order verification screen 960 displays an indication of receipt of the order as well as an indication of the selected product and the credit amount for the order. A pour button 962 may also be included on the order verification screen 960. Upon selection of the pour button 962, display 104 is updated to show the pour screen 410, such as shown in FIG. 4C, described above. The pour screen 410 may have the selected product from the order already selected and ready to be poured upon selection of the pour button 416.

Figure 10:
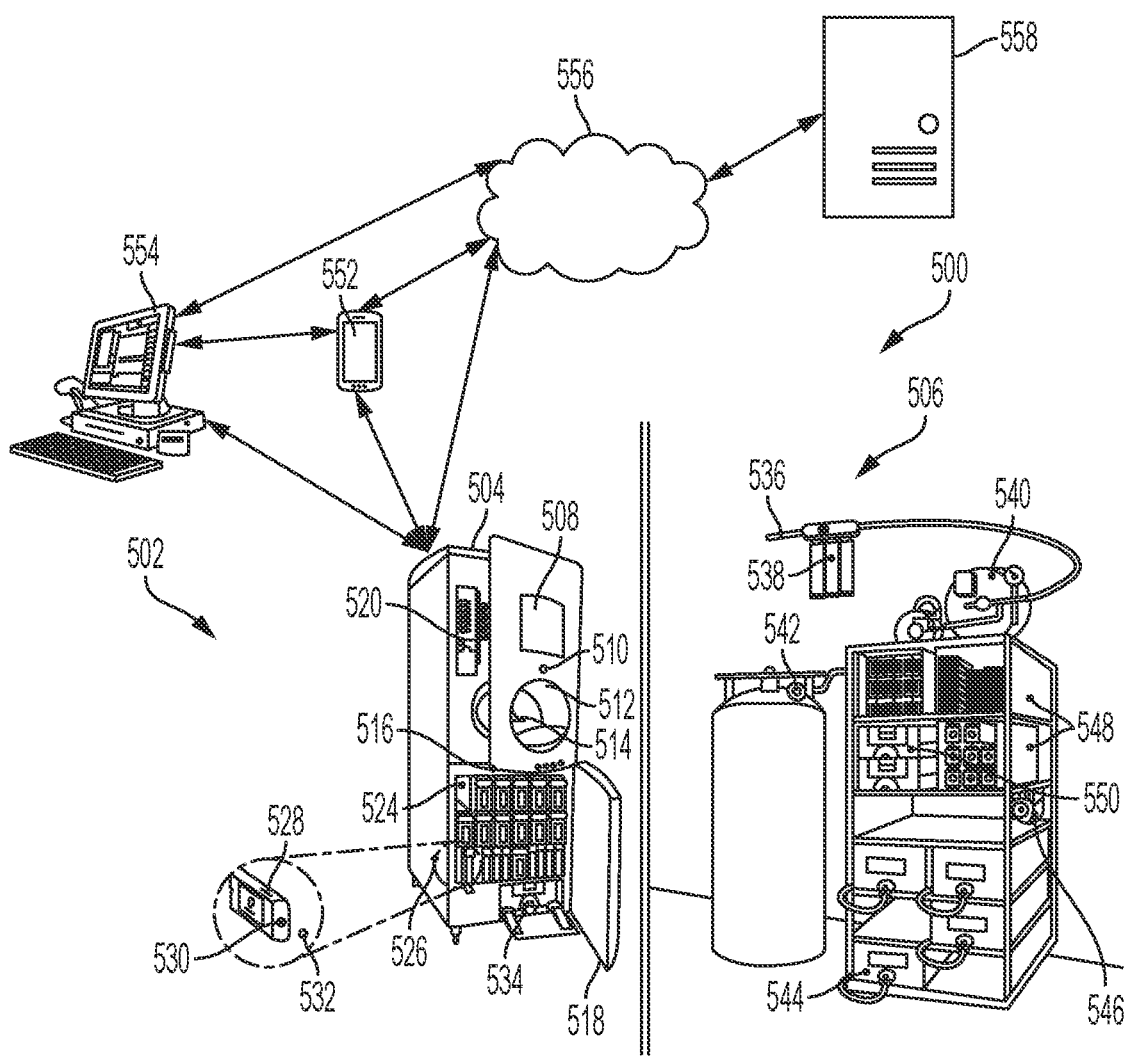
FIG. 10 illustrates an exemplary beverage dispenser system suitable for implementing the several embodiments of the disclosure.

FIG. 10 illustrates an exemplary beverage dispenser system 500 suitable for implementing the several embodiments of the disclosure. As shown, the beverage dispenser system 500 is configured as an ice cooled beverage dispenser. Other configurations of beverage dispensers are contemplated by this disclosure such as a drop-in ice-cooled beverage dispenser, a counter electric beverage dispenser, a remote recirculation beverage dispenser, or any other beverage dispenser configuration.

The beverage dispenser system 500 includes a front room system 502 with a beverage dispenser 504 and a back-room system 506. The beverage dispenser 504 includes a user interface 508, such as a touchscreen display, to facilitate selection of the beverage to be dispensed. The user interface 508 may employ various screens to facilitate user interactions on the beverage dispenser 504 and/or receive a user profile through interaction with a user's mobile device 552, such as described in commonly owned U.S. patent application Ser. No. 14/485,826, entitled "Product Categorization User Interface for a Dispensing Device," which is herein incorporated by reference in its entirety.

Upon receiving a beverage selection via the user interface 508, a pour button 510 may be activated to dispense the selected beverage from the beverage dispenser 504 via a nozzle 514. For example, the pour button 510 may be an electromechanical button, capacitive touch button, or other button selectable by a user to activate the beverage dispenser 504 to dispense a beverage. While shown as a button, the pour button 510 may alternatively be implemented as a lever or other mechanism for activating the beverage dispenser 504 to dispense a beverage. As shown in FIG. 10, the pour button 510 is separate from the user interface 508. In some implementations, the pour button 510 may be implemented as a selectable icon in the user interface 508.

In some implementations, the beverage dispenser may also include an ice lever 514. Upon being activated, the ice lever 514 may cause the beverage dispenser 504 to dispense ice through an ice chute (not shown). For beverage dispensers that do not have an ice bin, such as counter-electric or remote recirculation beverage dispensers, the ice lever 514 may be omitted.

The beverage dispenser 504 may be secured via a primary door 516 and an ingredient door 518. The primary door 516 and the ingredient door 518 may be secured via one or more locks. In some implementations, the locks are a lock and key. In some implementations, the lock on the ingredient door 518 may be opened via an RFID reader (not shown) reading an authorize ingredient package 528. The primary door 516 may secure electronic components of the beverage dispenser 504 including one or more controllers 520. The ingredient door 518 may secure an ingredient compartment that houses an ingredient matrix 524.

The ingredient matrix 524 includes a plurality of slots 526 for receiving ingredient packages 528. In various implementations, the ingredient packages 528 may be micro-ingredient cartridges. The micro-ingredient cartridges may be single cartridges or double cartridges, such as described in commonly owned U.S. patent application Ser. No. 14/209,684, entitled "Beverage Dispenser Container and Carton," and U.S. patent application Ser. No. 12/494,427, entitled "Container Filling Systems and Methods," which are both herein incorporated by reference in their entirety. As shown in FIG. 10, there are three drawers of ingredients in the ingredient matrix 524. One or more of the drawers may slide back and forth along a rail so as to periodically agitate the ingredients housed on the drawer. Other configurations of the ingredient matrix 524 are possible, such as via one or more static and/or agitated ingredient towers.

Each ingredient package 528 may comprise an RFID tag, a fitment 530, and a fitment seal 532. The fitment seal 532 may be removed prior to installation into the beverage dispenser 504. Upon installation, the fitment 530 may engage with and provide a fluidic communication between a probe (not shown) in the slot 526 and the ingredients contained in the ingredient package 528. The ingredient matrix 524 may also contain one or more large volume micro-ingredient packages 534, such as for one or more micro-ingredient sweetener sources.

The beverage dispenser 504 may also include a carbonator (not shown) for receiving water and carbon dioxide to produce carbonated water. The beverage dispenser 504 may also include one or more heat exchangers (not shown), such as a cold plate, for cooling one or more of the beverage ingredients contained in or received by the beverage dispenser 504. In some implementations, one or more of the micro-ingredients dispensed via the nozzle 512 are not cooled via the heat exchanger or are otherwise maintained at an ambient temperature. Macro-ingredients dispensed via the nozzle 512 are typically cooled via the heat exchanger prior to being dispensed.

The back-room system 506 is typically located in a back room remote from the front room system 502, such as a storage area in a merchant location. The back-room system 506 includes a water source 536 such as a municipal water supply that provides a pressurized source of plain water. The water received via the water source 536 may be filtered or otherwise treated by a water treatment system 538. The treated water may optionally be pressurized to a desired pressure with a water booster 540 and supplied to the beverage dispenser. A carbon dioxide source 542 may supply carbon dioxide to the beverage dispenser 504.

One or more macro-ingredient sources 544 may be located in the back room. The macro-ingredient from each macro-ingredient source 544 may be supplied to the beverage dispenser 504 via a pump 546. The pump 546 may be a controlled gear pump, diaphragm pump, BIB pump, or any other suitable pump for supplying macro-ingredients to the beverage dispenser 504. The back-room system 506 may also include a rack with one or more storage locations 548 for spare micro-ingredients and one or more storage locations 550 for spare macro-ingredients.

In some implementations, one or more features of the back-room system 506 may be integrated into the beverage dispenser 504. In some implementations, a back-room system 506 may not be provided.

The beverage dispenser 504 may include one or more network interfaces for communicating directly with devices in the front room or the back room, communicating with devices in the front room or the back room in a local area network (LAN), or communicating with devices remote from a location with the beverage dispenser system 500 via a wide area network (WAN) connection. For example, the beverage dispenser 504 may include networking devices such as a near field communication (NFC) module, a BLUETOOTH module, a WiFi module, a cellular modem, an Ethernet module, and the like. The beverage dispenser 504 may communicate via a direct communication or via a LAN with a user's mobile device 552 or a point-of-sale (POS) device 554 to receive a beverage selection or user profile of a user for configuring the beverage dispenser 504 to dispense one or more beverages based on the beverage selection or user profile. The user profile may include stored favorite beverages for the user, mixed or blended beverages created or stored by the user in their profile, and/or one or more beverage preferences, such as preferred nutritive level. The beverage dispenser 504 may also communicate via a WAN 556 for communicating with one or more remote servers 558 to receive software updates, content updates, user profiles, or beverage selections made via the remote server 558.

Figure 11:
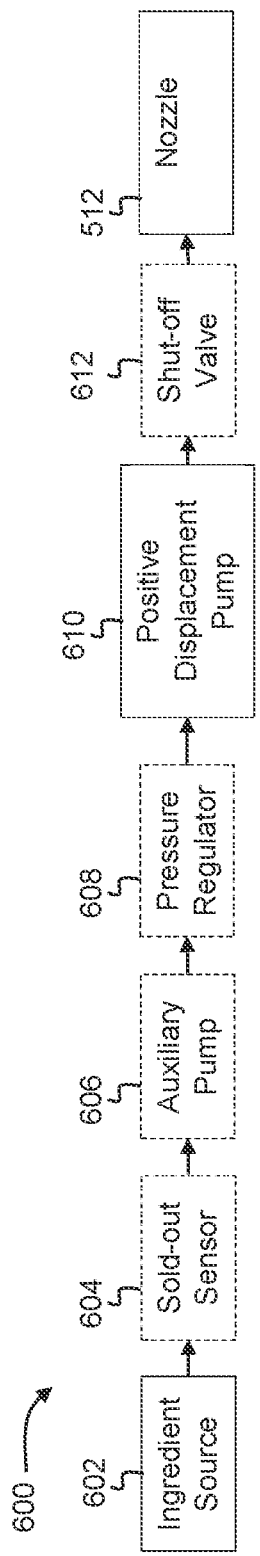
FIG. 11 illustrates an exemplary fluidic circuit with a positive displacement pump suitable for implementing the several embodiments of the disclosure.
Figure 12:
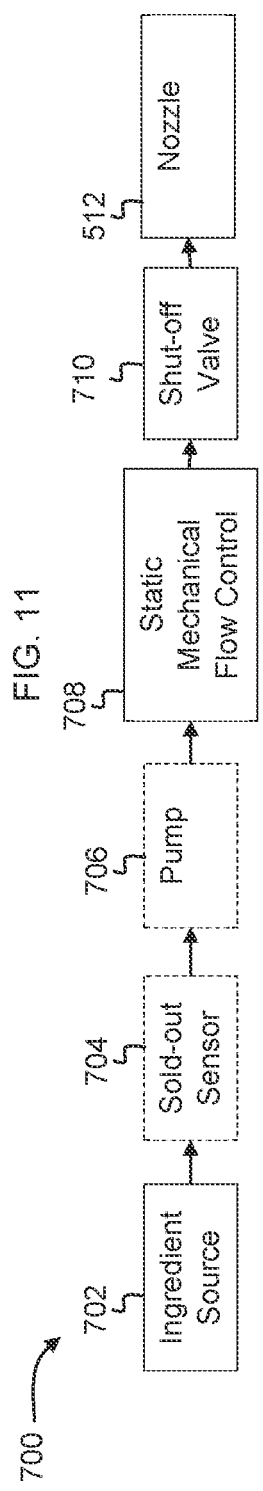
FIG. 12 illustrates an exemplary fluidic circuit with a static mechanical flow control suitable for implementing the several embodiments of the disclosure.
Figure 13:
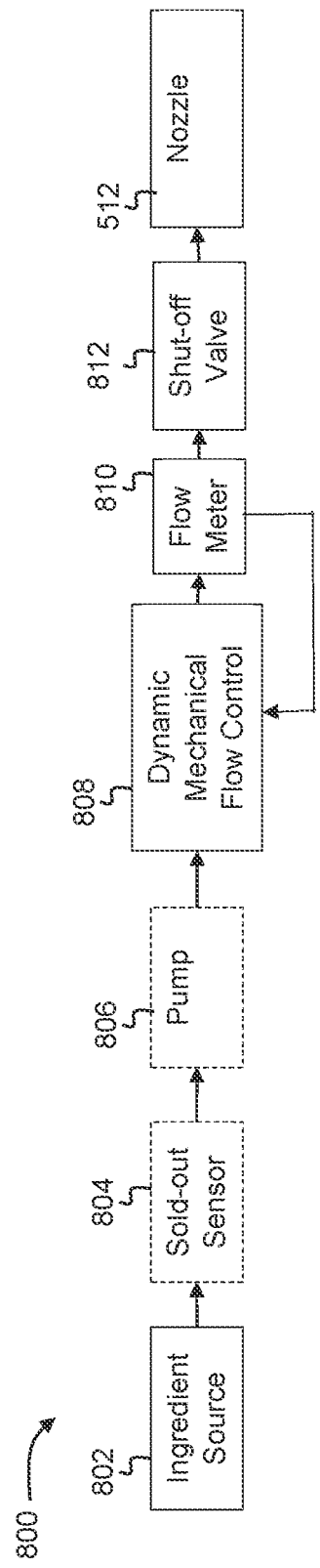
FIG. 13 illustrates an exemplary fluidic circuit with a dynamic mechanical flow control and flow meter suitable for implementing the several embodiments of the disclosure.

FIGS. 11-13 illustrate exemplary fluidic circuits 600-800 with pumping or metering devices from ingredient sources 602, 702, 802 to the nozzle 512 of the beverage dispenser 504. The beverage dispenser 504 may include none, one, or a plurality of the fluidic circuits shown in FIGS. 11-13. For each ingredient source, the beverage dispenser 504 may include one of the fluidic circuits shown in FIGS. 11-13. For example, each of the pumping or metering devices 108, 110, 112 may be implemented as one of the fluidic circuits shown in FIGS. 11-13.

FIG. 11 illustrates an exemplary fluidic circuit 600 with a positive displacement pump 610 suitable for implementing the several embodiments of the disclosure. The fluidic circuit 600 provides a fluid path from the ingredient source 602 to the nozzle 512. The ingredient source 602 may be a micro-ingredient source or a macro-ingredient source housed in the ingredient matrix 524 of the beverage dispenser 504, remote from the beverage dispenser 504 in the front room (e.g., adjacent to the beverage dispenser 504 or under a counter on which the beverage dispenser 504 is located), or located in the back room. The positive displacement pump 610 may meter a predetermined volume or flow rate of ingredient from the ingredient source 602 to the nozzle 512. The positive displacement pump 610 may be a piston pump, controlled gear pump, peristaltic pump, nutating pump, diaphragm pump, or other such positive displacement pump for metering a fixed volume of flow rate of a fluid with each cycle of the pump.

The fluidic circuit 600 may optionally include a sold-out sensor 604 for detecting when the ingredient source 602 is empty. When the ingredient source 602 is remotely located from the beverage dispenser 504, the fluidic circuit 600 may also optionally include an auxiliary pump 606 for providing a pressurized supply of the beverage ingredient to the beverage dispenser 504. Within or immediately adjacent to the beverage dispenser 504, the fluidic circuit 600 may include a pressure regulator 608 such that the inlet of the positive displacement pump 610 receives a lower or zero pressure supply of beverage ingredient. The fluidic circuit 600 may also optionally include a shut-off valve 612 that is configured to remain closed when an ingredient is not being dispensed so as to prevent beverage ingredient from dripping from the nozzle 512.

FIG. 12 illustrates an exemplary fluidic circuit 700 with a static mechanical flow control 708 suitable for implementing the several embodiments of the disclosure. The static mechanical flow control 708 receives a pressurized beverage ingredient from an ingredient source 702 and provides a fixed flow rate of the beverage ingredient to the nozzle 512. The static mechanical flow control 708 may be calibrated with a set screw for configuring the flow rate of the static mechanical flow control 708. A shut-off valve 710 downstream of the static mechanical flow control 708 may be actuated to open and close in order to dispense or prevent dispensing the beverage ingredient from the nozzle 512.

The ingredient source 702 may be a micro-ingredient source or a macro-ingredient source housed in the ingredient matrix 524 of the beverage dispenser 504, remote from the beverage dispenser 504 in the front room (e.g., adjacent to the beverage dispenser 504 or under a counter on which the beverage dispenser 504 is located), or located in the back room. The ingredient source 702 may also be the municipal water supply 536 or other pressurized ingredient source. When the ingredient source 702 is not pressurized, the fluidic circuit 700 may include a pump 706 for pressurizing the beverage ingredient from the ingredient source 702. The pump 706 may be any pump suitable for pressurizing the beverage ingredient from the ingredient source 702, such as a BIB pump, $CO_2$ driven pump, controlled gear pump, or positive displacement pump. The fluidic circuit 700 may also optionally include a sold-out sensor 704 for detecting when the ingredient source 702 is empty.

FIG. 13 illustrates an exemplary fluidic circuit 800 with a dynamic mechanical flow control 808, a flow meter 810, and a shut-off valve 812 suitable for implementing the several embodiments of the disclosure. The dynamic mechanical flow control 808 receives a pressurized beverage ingredient from an ingredient source 802 and provides an adjustable flow rate of the beverage ingredient to the nozzle 512. The dynamic mechanical flow control 808 may include a variable sized orifice that adjusts to dynamically change the flow rate of the beverage ingredient supplied to the nozzle 512 based on control signals provided by the one or more controllers 520. A flow meter 810 downstream of the dynamic mechanical flow control 808 measures a flow rate of the beverage ingredient being supplied by the dynamic mechanical flow control 808 and provides a feedback loop to the dynamic mechanical flow control 808 for controlling the variable sized orifice. A shut-off valve 812 downstream of the dynamic mechanical flow control 808 may be actuated to open and close in order to dispense or prevent dispensing the beverage ingredient from the nozzle 512.

The ingredient source 802 may be a micro-ingredient source or a macro-ingredient source housed in the ingredient matrix 524 of the beverage dispenser 504, remote from the beverage dispenser 504 in the front room (e.g., adjacent to the beverage dispenser 504 or under a counter on which the beverage dispenser 504 is located), or located in the back room. The ingredient source 802 may also be the municipal water supply 536 or other pressurized ingredient source. When the ingredient source 802 is not pressurized, the fluidic circuit 800 may include a pump 806 for pressurizing the beverage ingredient from the ingredient source 802. The pump 806 may be any pump suitable for pressurizing the beverage ingredient from the ingredient source 802, such as a BIB pump, $CO_2$ driven pump, controlled gear pump, or positive displacement pump. The fluidic circuit 800 may also optionally include a sold-out sensor 804 for detecting when the ingredient source 802 is empty.

While the components of the fluidic circuits 600-800 are shown in a particular order in FIGS. 11-13, any order of the components described above may be used. For example, the shut-off valve 812 may be upstream of the flow meter 810. Other variations are readily recognizable by those of ordinary skill in the art. Additionally, one or more heat exchangers (not shown) may be used at any location in the fluidic circuits of FIGS. 11-13. The heat exchanger may include an ice bin, water bath, cold plate, or remote recirculation system.

Figure 14:
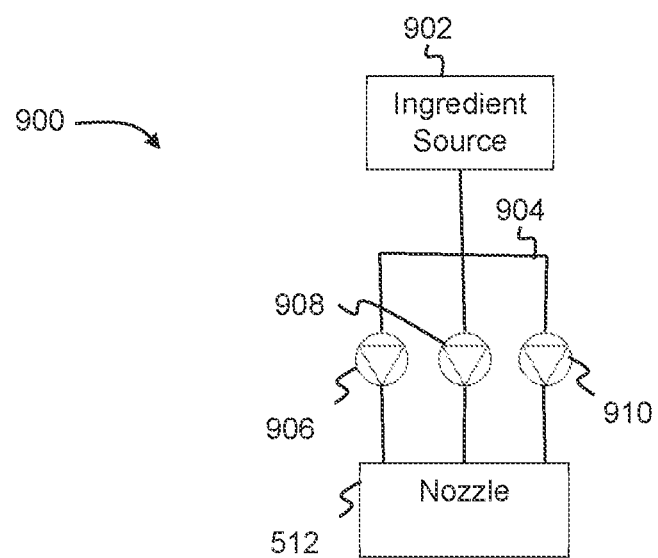
FIG. 14 illustrates an exemplary fluidic circuit with a plurality of independently controlled paths from a single ingredient source suitable for implementing the several embodiments of the disclosure.

FIG. 14 illustrates an exemplary fluidic circuit 900 with a plurality of independently controlled paths from a single ingredient source 902 to the nozzle 512 suitable for implementing the several embodiments of the disclosure. The fluidic circuit 900 includes a manifold 904 for supplying beverage ingredient to each of the independently controlled paths. Each path includes a pumping or metering device 906, 908, 910 for supplying beverage ingredient from the ingredient source 902 to the nozzle 512. The pumping or metering devices 906, 908, 910 may be configured as any of the fluidic circuits 600-800 shown in FIGS. 11-13. By having multiple independent paths from the ingredient source 902 to the nozzle 512, a larger range of flow rates are possible than using any one of the pumping or metering devices 906, 908, 910. For example, for a first flow rate of beverage ingredient from the ingredient source, only one of the pumping or metering devices 906, 908, 910 may be activated. For a second flow rate of the beverage ingredient from the ingredient source, a plurality of the pumping or metering devices 906, 908, 910 may be activated.

Figure 15:
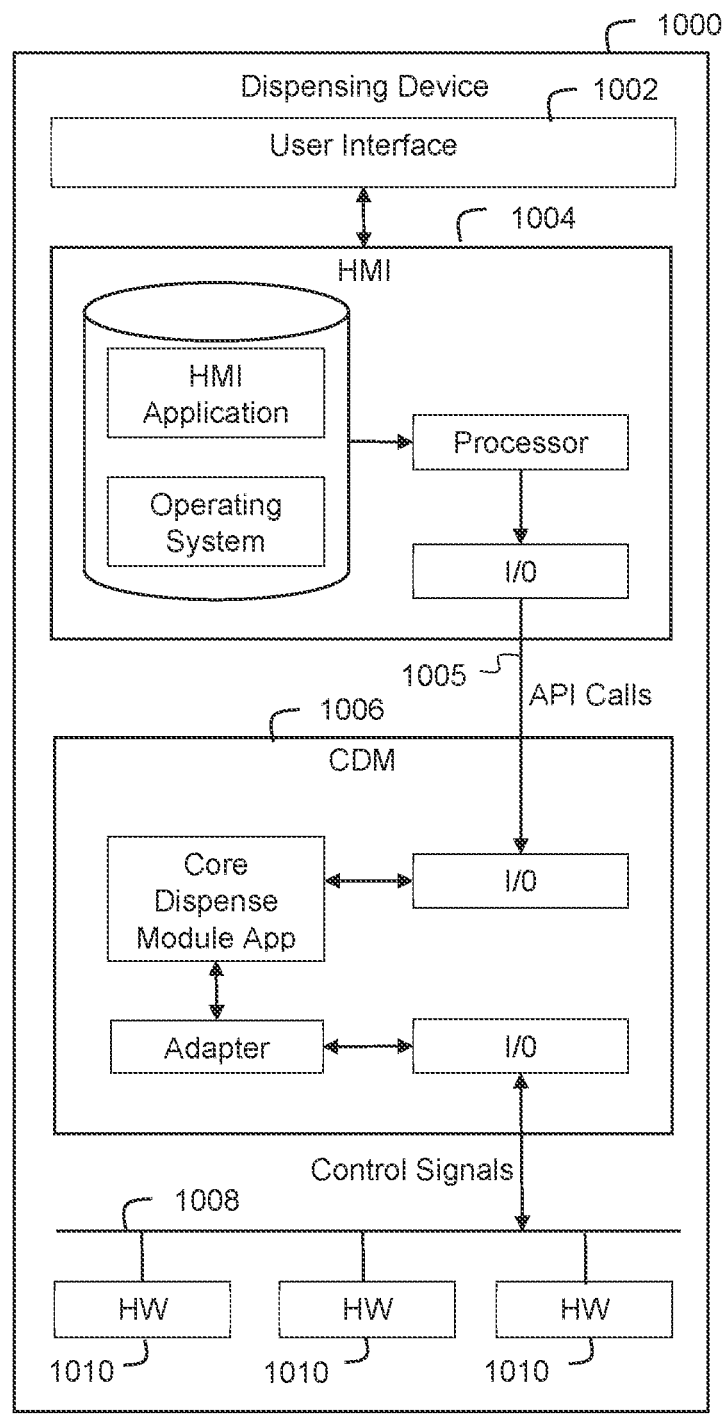
FIG. 15 illustrates an exemplary block diagram of a control architecture for a beverage dispenser suitable for implementing the several embodiments of the disclosure.

FIG. 15 illustrates an exemplary block diagram of a control architecture 1000 that may be used to control the beverage dispenser 504 suitable for implementing the several embodiments of the disclosure. As shown in FIG. 15, control architecture 1000 may comprise a core dispense module (CDM) 1006, a human machine interface (HMI) module 1004, a user interface (UI) 1002, and a machine bus (MBUS) 1005. HMI 1004 may connect to or otherwise interface and communicate with at least one external device (e.g., mobile device 552 or POS 554) being external to beverage dispenser 504. HMI 1004 may also control and update display screens on UI 1002. CDM 1006 may control flows from a plurality of pumps and/or valves 1010 in beverage dispenser 504 according to a recipe to mix and dispense a product (e.g., a beverage) from beverage dispenser 504. In some implementations the CDM 1006 and the HMI 1004 may be integrated together as a single integrated system that performs the operations of both the HMI 1004 and the CDM 1006.

Beverage ingredients (e.g., micro-ingredients, macro-ingredients, and/or diluents) may be combined to dispense various products that may include beverages or blended beverages (i.e., finished beverage products) from beverage dispenser 504. However, beverage dispenser 504 may also be configured to dispense beverage components individually.

An example of control architecture 1000 for beverage dispenser 504 may be described in U.S. Ser. No. 61/987,020, entitled "Dispenser Control Architecture", filed on May 1, 2014, the entirety of which is hereby incorporated by reference. MBUS 1005 may facilitate communication between HMI 1004 and CDM 1006 via one or more API calls. HMI 1004, MBUS 1005, and CDM 1006 may collectively comprise common core components, implemented as hardware or as combination of hardware and software, which may be adapted to provide customized functionality in beverage dispenser 504. Beverage dispenser 504 may further include memory storage and a processor. Examples of UI 1002 may be described in U.S. Ser. No. 61/877,549, entitled "Product Categorization User Interface for a Dispensing Device", filed on Sep. 13, 2013, the entirety of which is hereby incorporated by reference. The UI 1002 may include the user interfaces 400 described above.

UI 1002 may detect what area of a touch screen has been touched by a user (e.g., user 108). In response, UI 1002 may send HMI 1004 data regarding where the touch screen was touched. In response, HMI 1004 may interpret this received data to determine whether to have UI 1002 display a different UI screen or to issue a command to CDM 1006. For example, HMI 1004 may determine that the user touched a portion of the touch screen corresponding to a beverage brand. In response, HMI 1004 may issue a command to CDM 1006 to pour the corresponding beverage brand. In response to receiving the command to pour the corresponding beverage brand, the CDM 1006 in turn issues commands via one or more control buses 1008 to the pumping or metering devices 1010 for the beverage ingredients needed to dispense the beverage brand. Or HMI 1004 may determine that the user touched a portion of the touch screen corresponding to a request for another screen. In response, HMI 1004 may cause UI 1002 to display the requested screen.

In some embodiments, UI 1002 in beverage dispenser 504 may be utilized to select and individually dispense one or more beverages. The beverages may be dispensed as beverage components in a continuous pour operation whereby one or more selected beverage components continue to be dispensed while a pour input is actuated by a user or in a batch pour operation where a predetermined volume of one or more selected beverage components are dispensed (e.g., one ounce at a time). UI 1002 may be addressed via a number of methods to select and dispense beverages. For example, a user may interact with UI 1002 via touch input to navigate one or more menus from which to select and dispense a beverage. As another example, a user may type in a code using an onscreen or physical keyboard (not shown) on beverage dispenser 504 to navigate one or more menus from which to select and dispense a beverage. As a further example, a user may interact with the HMI 1004 via a user interface of an application on the mobile device 552.

UI 1002, which may include a touch screen and a touch screen controller, may be configured to receive various commands from a user (i.e., consumer input) in the form of touch input, generate a graphics output and/or execute one or more operations with beverage dispenser 504 (e.g., via HMI 1004 and/or CDM 1006), in response to receiving the aforementioned commands. A touch screen driver in HMI 1004 may be configured to receive the consumer or customer inputs and generate events (e.g., touch screen events) that may then be communicated through a controller to an operating system of HMI 1004.

Beverage dispenser 504 may be in communication with one or more external device (e.g., mobile device 552 or POS 554). In some embodiments, the communication between beverage dispenser 504 and the external device may be accomplished utilizing any number of communication techniques including, but not limited to, near-field wireless technology such as BLUETOOTH, Wi-Fi and other wireless or wireline communication standards or technologies, via a communication interface.

FIG. 15 illustrates an exemplary computer system 1100 suitable for implementing the several embodiments of the disclosure. For example, one or more components or controller components of the beverage dispenser 504 may be implemented as the computer system 1100. In some implementations, one or both of the HMI 1004 and the CDM 1006 may be implemented as the computer system 1100. In various implementations, one or more of the mobile device 122, server 128, or components of the beverage vendor 102 may be implemented as the computer system 1100.

It should be appreciated that the logical operations described herein with respect to the various figures may be implemented (1) as a sequence of computer implemented acts or program modules (i.e., software) running on a computing device (e.g., the computing device described in FIG. 16), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Figure 16:
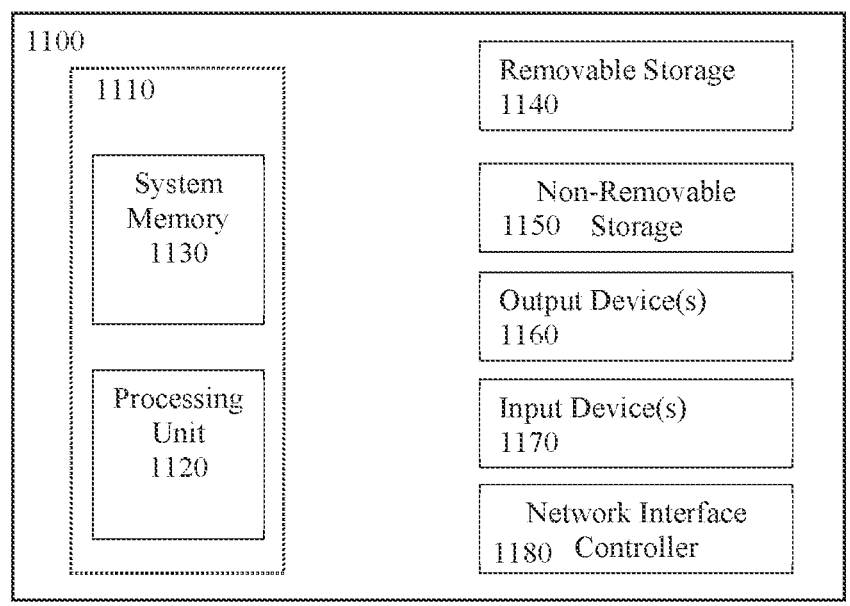
FIG. 16 illustrates an exemplary computer system suitable for implementing the several embodiments of the disclosure.

Referring to FIG. 16, an example computing device 1100 upon which embodiments of the invention may be implemented is illustrated. For example, each of the content source, key server, segmentations servers, caching servers, and client devices described herein may each be implemented as a computing device, such as computing device 1100. It should be understood that the example computing device 1100 is only one example of a suitable computing environment upon which embodiments of the invention may be implemented. Optionally, the computing device 1100 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In some embodiments, the computing device 1100 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some embodiments, virtualization software may be employed by the computing device 1100 to provide the functionality of a number of servers that is not directly bound to the number of computers in the computing device 1100. For example, virtualization software may provide twenty virtual servers on four physical computers. In some embodiments, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In its most basic configuration, computing device 1100 typically includes at least one processing unit 1106 and system memory 1104. Depending on the exact configuration and type of computing device, system memory 1104 may be volatile (such as random-access memory (RAM)), non-volatile (such as read-only memory (ROM), flash memory, etc.), or some combination of the two. This most basic configuration is illustrated in FIG. 16 by dashed line 1102. The processing unit 1106 may be a standard programmable processor that performs arithmetic and logic operations necessary for operation of the computing device 1100. While only one processing unit 1106 is shown, multiple processors may be present. Thus, while instructions may be discussed as executed by a processor, the instructions may be executed simultaneously, serially, or otherwise executed by one or multiple processors. The computing device 1100 may also include a bus or other communication mechanism for communicating information among various components of the computing device 1100.

Computing device 1100 may have additional features/functionality. For example, computing device 1100 may include additional storage such as removable storage 1108 and non-removable storage 1110 including, but not limited to, magnetic or optical disks or tapes. Computing device 1100 may also contain network connection(s) 1116 that allow the device to communicate with other devices such as over the communication pathways described herein. The network connection(s) 1116 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 1100 may also have input device(s) 1114 such as a keyboard, keypads, switches, dials, mice, track balls, touch screens, voice recognizers, card readers, paper tape readers, or other well-known input devices. Output device(s) 1112 such as a printer, video monitors, liquid crystal displays (LCDs), touch screen displays, displays, speakers, etc. may also be included. The additional devices may be connected to the bus in order to facilitate communication of data among the components of the computing device 1100. All these devices are well known in the art and need not be discussed at length here.

The processing unit 1106 may be configured to execute program code encoded in tangible, computer-readable media. Tangible, computer-readable media refers to any media that is capable of providing data that causes the computing device 1100 (i.e., a machine) to operate in a particular fashion. Various computer-readable media may be utilized to provide instructions to the processing unit 1106 for execution. Example tangible, computer-readable media may include, but is not limited to, volatile media, non-volatile media, removable media, and non-removable media implemented in any method or technology for storage of information such as computer readable instructions, data structures, program modules or other data. System memory 1104, removable storage 1108, and non-removable storage 1110 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 1106 may execute program code stored in the system memory 1104. For example, the bus may carry data to the system memory 1104, from which the processing unit 1106 receives and executes instructions. The data received by the system memory 1104 may optionally be stored on the removable storage 1108 or the non-removable storage 1110 before or after execution by the processing unit 1106.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A beverage vendor, comprising:
   a nozzle configured to dispense one or more beverage ingredients of a beverage associated with an order;
   a user interface configured to display a list of pending orders;
   a plurality of pumping or metering devices, each configured to supply a beverage ingredient from an ingredient source to the nozzle; and
   a controller configured to receive a selection of an order from the list of pending orders and authenticate the order for being dispensed from the nozzle, wherein upon authenticating the order, the controller is configured to initiate a pour operation of the order from the nozzle, wherein the controller is configured to update the list of pending orders to remove an order that is associated with a mobile device that is determined to not be proximate to the beverage vendor.

2. The beverage vendor of claim 1, wherein authenticating the order comprises receiving a personal identification number (PIN) code on the user interface.

3. The beverage vendor of claim 2, wherein the controller is further configured to authenticate the PIN code based on comparison with an authentic PIN code maintained with the order in the list of pending orders.

4. The beverage vendor of claim 2, wherein the controller is further configured to request authentication of the PIN code from a server in communication with the beverage vendor and receive an authentication reply from the server.

5. The beverage vendor of claim 1, wherein the controller is further configured to send an order notification of the selected order to a server in communication with the beverage vendor.

6. The beverage vendor of claim 5, wherein the controller is further configured to receive an authentication reply from the server in response to the server receiving an authentication reply from a mobile device that placed the order.

7. The beverage vendor of claim 1, wherein the list of pending orders include orders that have been purchased, but not fulfilled.

8. The beverage vendor of claim 7, wherein the controller is configured to update the list of pending orders to add an order associated with a mobile device that is proximate to the beverage vendor.

9. The beverage vendor of claim 8, further comprising:
a beacon configured to broadcast a beacon message with a unique identifier of the beverage vendor.

10. The beverage vendor of claim 9, wherein the mobile device is determined to be proximate to the beverage vendor upon receiving the beacon message.

11. The beverage vendor of claim 7, wherein the controller is configured to update the list of pending orders to remove an order that has been fulfilled at the beverage vendor.

12. The beverage vendor of claim 7, wherein the controller is configured to update the list of pending orders to add an order that designates the beverage vendor for fulfillment of the order.

* * * * *